US012784321B2

(12) United States Patent
Bian et al.

(10) Patent No.: US 12,784,321 B2
(45) Date of Patent: Nov. 3, 2026

(54) ANIMATION PROCESSING METHOD AND RELATED APPARATUS

(71) Applicant: Huawei Technologies Co., Ltd., Shenzhen (CN)

(72) Inventors: Chao Bian, Nanjing (CN); Xiaoxiao Chen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 524 days.

(21) Appl. No.: 18/344,247

(22) Filed: Jun. 29, 2023

(65) Prior Publication Data

US 2023/0351665 A1 Nov. 2, 2023

Related U.S. Application Data

(63) Continuation of application No. PCT/CN2021/140434, filed on Dec. 22, 2021.

(30) Foreign Application Priority Data

Dec. 31, 2020 (CN) ......................... 202011639675.2

(51) Int. Cl.
*G06T 13/80* (2011.01)
*H04M 1/72427* (2021.01)

(52) U.S. Cl.
CPC ......... *G06T 13/80* (2013.01); *H04M 1/72427* (2021.01); *G06T 2200/24* (2013.01); *G06T 2213/12* (2013.01)

(58) Field of Classification Search
CPC .... G06F 3/0485; G06F 3/0483; G06F 3/0481; G06F 9/547; G06T 2200/24; G06T 13/80;
(Continued)

(56) References Cited

U.S. PATENT DOCUMENTS 10,423,716 B2 * 9/2019 Gevlich ................ G06F 40/169
2011/0267358 A1 * 11/2011 Rennuit .................. G06T 13/40
345/474

(Continued)

FOREIGN PATENT DOCUMENTS

CN 109147016 A 1/2019
CN 109242934 A 1/2019

(Continued)

OTHER PUBLICATIONS

Weixin_33774308 et al., "Android Lottie animation library research", Jan. 17, 2019, total: 8 pages.

*Primary Examiner* — Phi Hoang
(74) *Attorney, Agent, or Firm* — Slater Matsil, LLP

(57) ABSTRACT

This application discloses an animation processing method and a related apparatus. The method includes: An electronic device runs a first application; the electronic device invokes an animation configuration file to display a first animation of the first application, where the animation configuration file includes N feature attributes of the first animation and values corresponding to the N feature attributes, and N is a positive integer; the electronic device runs a second application; and the electronic device invokes the animation configuration file to display a second animation of the second application, where the animation configuration file includes M feature attributes of the second animation and values corresponding to the M feature attributes, and M is a positive integer.

20 Claims, 24 Drawing Sheets

(58) Field of Classification Search
CPC . G06T 2213/12; G06T 13/00; H04M 1/72427
See application file for complete search history.

(56) References Cited

U.S. PATENT DOCUMENTS

| | | | | |
|---|---|---|---|---|
| 2012/0021828 | A1 | 1/2012 | Raitt et al. | |
| 2014/0189527 | A1* | 7/2014 | Kruglick | G06F 3/04817 715/746 |
| 2015/0280992 | A1* | 10/2015 | Wang | H04L 69/324 370/254 |
| 2016/0358366 | A1 | 12/2016 | Wang et al. | |
| 2017/0286913 | A1* | 10/2017 | Liu | H04W 4/12 |
| 2020/0349753 | A1* | 11/2020 | Liu | G06F 9/44505 |
| 2020/0394051 | A1* | 12/2020 | Chen | G06F 9/44505 |
| 2021/0004576 | A1* | 1/2021 | Bui | G10L 15/24 |

FOREIGN PATENT DOCUMENTS

| | | | |
|---|---|---|---|
| CN | 111046198 | A | 4/2020 |
| CN | 111553967 | A | 8/2020 |

* cited by examiner

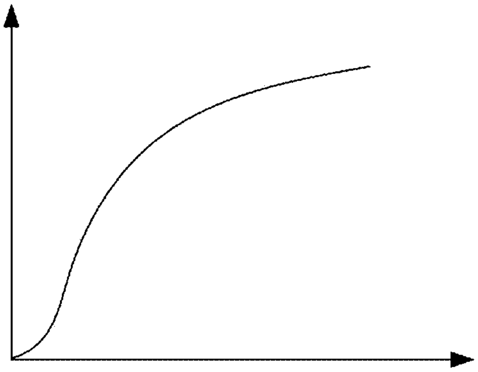
Bezier curve with an interpolator 20-90
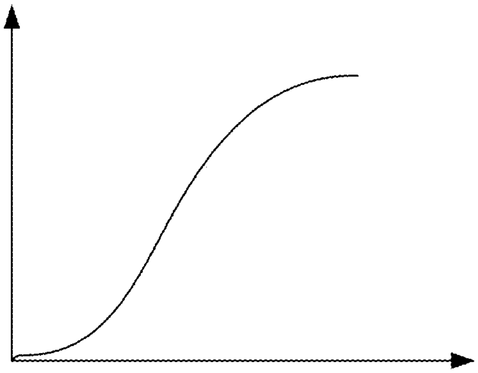
Bezier curve with an interpolator 33-33
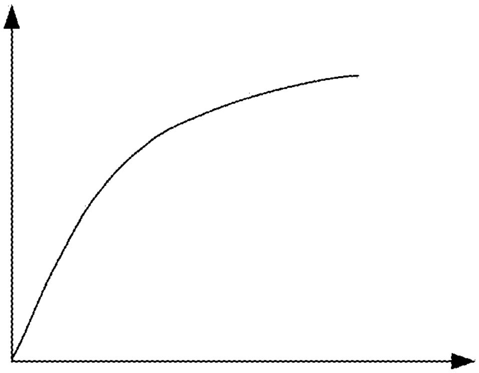
Bezier curve with an interpolator 0-90
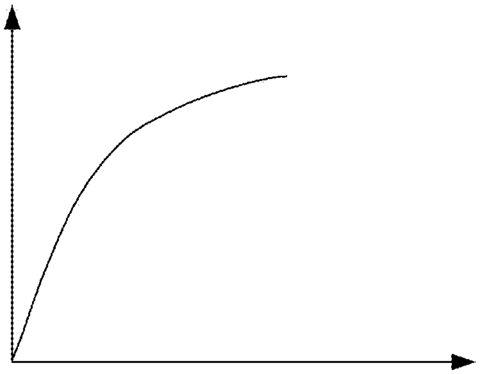
Bezier curve with an interpolator 0-100
FIG. 5

```
{
  "name": "hw_scence_transfer_open_enter",
  "attrs": [
    {
      "name": "hw_scence_transfer_open_enter_duration",
      "type": "integer",
      "value": "300"
    },
    {
      "name": "delay",
      "type": "integer",
      "value": "50"
    }
  ],
  "subAnimations": [
    {
      "name": "hw_scence_transfer_open_enter_alpha",
      "attrs": [
        {
          "name": "hw_scence_transfer_open_enter_alpha_duration",
          "type": "integer",
          "value": "300"
        },
        {
          "name": "hw_scence_transfer_open_enter_alpha_duration_delay",
          "type": "integer",
          "value": "50"
        },
        {
          "name": "hw_scence_transfer_open_enter_alpha_from",
          "type": "float",
          "value": "0"
        },
        {
          "name": "hw_scence_transfer_open_enter_alpha_to",
          "type": "float",
          "value": "1"
        },
        {
          "name": "hw_scence_transfer_open_enter_alpha_X1",
          "type": "float",
          "value": "0.4"
        },
        {
          "name": "hw_scence_transfer_open_enter_alpha_Y1",
          "type": "float",
          "value": "0"
        },
        {
          "name": "hw_scence_transfer_open_enter_alpha_X2",
          "type": "float",
          "value": "0.2"
        },
        {
          "name": "hw_scence_transfer_open_enter_alpha_Y2",
          "type": "float",
          "value": "1"
        }
      ]
    }
  ]
}
```

FIG. 15

ANIMATION PROCESSING METHOD AND RELATED APPARATUS

CROSS-REFERENCE TO RELATED APPLICATIONS

This application is a continuation of International Application No. PCT/CN2021/140434, filed on Dec. 22, 2021, which claims priority to Chinese Patent Application No. 202011639675.2, filed on Dec. 31, 2020. The disclosures of the aforementioned applications are hereby incorporated by reference in their entireties.

TECHNICAL FIELD

This application relates to the field of electronic device technologies, and in particular, to an animation processing method and a related apparatus.

BACKGROUND

Development of user experience designs is increasingly perfect, and excellent animations are indispensable for improving user experience. Excellent dynamic interface designs can enhance user experience of products.

Animations are scattered as detail effects, and each scene may have a unique effect. Different animations are usually used to implement different features of different modules. Implementations of the animations are independent. As a result, separate adaptation is also required for integration or implementations of applications. However, each animation includes some same attributes, but values of the attributes are different. In addition, a same animation may not be commonly used on a plurality of devices. In this way, reusability and inheritance of an animation effect are greatly reduced.

Based on this background, how to better implement animation reuse and cross-device sharing becomes a focus of all-scene development.

SUMMARY

This application provides an animation processing method and a related apparatus, to implement a function of managing animations in a unified manner.

According to a first aspect, this application provides an animation processing method, including: An electronic device runs a first application; the electronic device invokes an animation configuration file to display a first animation of the first application, where the animation configuration file includes N feature attributes of the first animation and values corresponding to the N feature attributes, and N is a positive integer; the electronic device runs a second application; and the electronic device invokes the animation configuration file to display a second animation of the second application, where the animation configuration file includes M feature attributes of the second animation and values corresponding to the M feature attributes, and M is a positive integer.

In this embodiment of this application, the electronic device provides the animation configuration file applicable to animation invocation of a system, a control, and an application. For applications, for example, an application A and an application B, the application A and the application B invoke a same animation configuration file, and display animations in the applications based on the same animation configuration file. Similarly, the system and the control of the electronic device may also invoke animations based on the animation configuration file. The animation configuration file includes a plurality of feature attributes of animations (including the N feature attributes and the M feature attributes). The feature attributes are a set of feature attributes summarized from features of the animations. An existing animation is configured based on the set of feature attributes, so that different animations can be managed in a unified manner.

In a possible implementation, that an electronic device runs a first application includes: The electronic device receives a first operation, and the electronic device runs the first application in response to the first operation. That the electronic device runs a second application includes: The electronic device receives a second operation, and the electronic device runs the second application in response to the second operation. Herein, it is indicated that if the electronic device runs the first application based on the first operation, the first animation may be an entry animation of the first application; or if the electronic device runs the second application based on the first operation, the second animation may be an entry animation of the second application.

In a possible implementation, the N feature attributes and the M feature attributes each include a first feature attribute of the animation configuration file, and a value corresponding to the first feature attribute is a first value. The method further includes: The electronic device modifies the first value corresponding to the first feature attribute to a second value; the electronic device receives a third operation; the electronic device runs the first application in response to the third operation; the electronic device invokes the animation configuration file to display the first animation based on the second value of the first feature attribute; the electronic device receives a fourth operation; the electronic device runs the second application in response to the fourth operation; and the electronic device invokes the animation configuration file to display the second animation based on the second value of the first feature attribute. Herein, it is described that a common feature attribute of the first animation and the second animation is the first feature attribute. Because the animations of the first application and the second application are invoked based on the animation configuration file, when the value of the first feature attribute in the animation configuration file changes, display effects of the first animation and the second animation each change based on a change of the value of the first feature attribute. A system animation and a spatial animation are similar. When a value of a feature attribute in the animation configuration file changes, an animation invoked by using the feature attribute changes accordingly. Herein, the electronic device manages and modifies animations of a plurality of applications in a unified manner, thereby greatly reducing workload of research and development personnel.

In a possible implementation, the feature attributes include a duration attribute, a curve attribute, and a frame rate attribute. The feature attributes may further include a color attribute, a transparency attribute, and the like.

In a possible implementation, the method further includes: The electronic device invokes the animation configuration file to display a third animation, where the animation configuration file includes an animation template corresponding to the third animation, and the animation template is defined by at least one of the feature attributes. In this embodiment of this application, the animation template provided in the animation configuration file includes a physical engine (sliding, dragging, pinching, a velocity, a spring, friction, finger following, page turning, and the like), a system animation (a long take, a hierarchical relationship, motion orchestration, and the like), a control animation (animations of various controls), a feature animation (a ripple, a pulse, growth, a rhythm, fusion, breathing, rotation, and the like), an application animation, and the like.

In a possible implementation, that the electronic device invokes an animation configuration file to display a first animation of the first application includes: The electronic device obtains the animation configuration file, and stores the animation configuration file in application data of the first application; the electronic device parses the animation configuration file to generate an animation model parameter table of the first application; and the electronic device obtains, based on the animation model parameter table of the first application, the N feature attributes of the first animation and the parameter values corresponding to the N feature attributes, and displays the first animation. The first application of the electronic device obtains the animation configuration file at a kernel layer and stores the animation configuration file in the application data of the first application, parses the animation configuration file to obtain an animation parameter, and generates the animation model parameter table of the first application. A corresponding animation is displayed based on the animation model parameter table of the first application. When the animation configuration file is updated, the application A and the application B obtain the animation configuration file again for update, and the displayed animations are updated accordingly. Herein, a function of managing, by the electronic device, animations of different applications in a unified manner is implemented.

In a possible implementation, a feature attribute of a fourth animation in the animation model parameter table of the first application is different from a feature attribute of the fourth animation in the animation configuration file; or a value corresponding to a feature attribute of a fourth animation in the animation model parameter table of the first application is different from a value corresponding to the feature attribute of the fourth animation in the animation configuration file. Herein, it is described that a feature attribute of an animation in the animation model parameter table of the first application may be different from that in the animation configuration file. Research and development personnel may perform customized modification on the animation model parameter table of the first application without affecting content of the animation configuration file. In other words, embodiments of this application support personalized designs of animations of application software.

In a possible implementation, the method further includes: When a preset rule is met, the electronic device modifies a value corresponding to a second feature attribute of a fifth animation in the animation configuration file. Herein, it is described that the electronic device may dynamically modify the animation configuration file when the preset rule is met, thereby improving configuration flexibility.

In a possible implementation, the preset rule is that within a preset time period, a quantity of times that a time interval between two adjacent user operations is less than preset time exceeds a threshold. That the electronic device modifies a value corresponding to a second feature attribute of a fifth animation in the animation configuration file includes: The electronic device decreases a value corresponding to a duration attribute of the fifth animation in the animation configuration file, where the second feature attribute includes the duration attribute. Herein, the electronic device collects statistics on an interval between two adjacent operations of a user, and may determine a preference and a personality of the user based on the statistics. For example, the personality of the user is to pursue efficiency, and the electronic device may decrease the value corresponding to the duration attribute in the animation configuration file by some. A more user-friendly design is provided.

In a possible implementation, the preset rule is that when current time of the electronic device is within a first time period, the animation configuration file is a first configuration; and when the current time of the electronic device is within a second time period, the animation configuration file is a second configuration, where a value corresponding to a duration attribute of the fifth animation in the first configuration is less than a value corresponding to the duration attribute of the fifth animation in the second configuration, and the second feature attribute includes the duration attribute. Herein, the first time period may be, for example, daytime, and the second time period may be, for example, nighttime. In the daytime, a user is busier and pursues efficiency. In this case, the value corresponding to the duration attribute in the animation configuration file may be shorter than that in the nighttime. The user is more relaxed in the nighttime. In this case, the electronic device may increase the value corresponding to the duration attribute in the animation configuration file by some. Herein, a more user-friendly design is provided.

According to a second aspect, this application provides an electronic device, including one or more processors, one or more memories, and a communication interface. The one or more memories and the communication interface are coupled to the one or more processors. The one or more memories are configured to store computer program code, and the computer program code includes computer instructions. When the one or more processors execute the computer instructions, the electronic device is enabled to perform the following operations: running a first application; invoking an animation configuration file to display a first animation of the first application, where the animation configuration file includes N feature attributes of the first animation and values corresponding to the N feature attributes, and N is a positive integer; running a second application; and invoking the animation configuration file to display a second animation of the second application, where the animation configuration file includes M feature attributes of the second animation and values corresponding to the M feature attributes, and M is a positive integer.

In this embodiment of this application, the electronic device provides the animation configuration file applicable to animation invocation of a system, a control, and an application. For applications, for example, an application A and an application B, the application A and the application B invoke a same animation configuration file, and display animations in the applications based on the same animation configuration file. Similarly, the system and the control of the electronic device may also invoke animations based on the animation configuration file. The animation configuration file includes a plurality of feature attributes of animations. The feature attributes are a set of feature attributes summarized from features of the animations. An existing animation is configured based on the set of feature attributes, so that different animations can be managed in a unified manner.

In a possible implementation, the running a first application includes: receiving a first operation, and running the first application in response to the first operation; and the running a second application includes: receiving a second operation, and running the second application in response to the second operation. Herein, it is indicated that if the electronic device runs the first application based on the first operation, the first animation may be an entry animation of the first application; or if the electronic device runs the second application based on the first operation, the second animation may be an entry animation of the second application.

In a possible implementation, the N feature attributes and the M feature attributes each include a first feature attribute of the animation configuration file, and a value corresponding to the first feature attribute is a first value. The method further includes: modifying the first value corresponding to the first feature attribute to a second value; receiving a third operation; running the first application in response to the third operation; invoking the animation configuration file to display the first animation based on the second value of the first feature attribute; receiving a fourth operation; running the second application in response to the fourth operation; and invoking the animation configuration file to display the second animation based on the second value of the first feature attribute. Herein, it is described that a common feature attribute of the first animation and the second animation is the first feature attribute. Because the animations of the first application and the second application are invoked based on the animation configuration file, when the value of the first feature attribute in the animation configuration file changes, display effects of the first animation and the second animation each change based on a change of the value of the first feature attribute. A system animation and a spatial animation are similar. When a value of a feature attribute in the animation configuration file changes, an animation invoked by using the feature attribute changes accordingly. Herein, a function of managing and modifying, by the electronic device, animations of a plurality of applications in a unified manner is implemented, thereby greatly reducing workload of research and development personnel.

In a possible implementation, the feature attributes include a duration attribute, a curve attribute, and a frame rate attribute. The feature attributes may further include a color attribute, a transparency attribute, and the like.

In a possible implementation, the method further includes: invoking the animation configuration file to display a third animation, where the animation configuration file includes an animation template corresponding to the third animation, and the animation template is defined by at least one of the feature attributes. In this embodiment of this application, the animation template provided in the animation configuration file includes a physical engine (sliding, dragging, pinching, a velocity, a spring, friction, finger following, page turning, and the like), a system animation (a long take, a hierarchical relationship, motion orchestration, and the like), a control animation (animations of various controls), a feature animation (a ripple, a pulse, growth, a rhythm, fusion, breathing, rotation, and the like), an application animation, and the like.

In a possible implementation, the invoking an animation configuration file to display a first animation of the first application includes: obtaining the animation configuration file, and storing the animation configuration file in application data of the first application; parsing the animation configuration file to generate an animation model parameter table of the first application; and obtaining, based on the animation model parameter table of the first application, the N feature attributes of the first animation and the parameter values corresponding to the N feature attributes, and displaying the first animation. The first application obtains the animation configuration file at a kernel layer and stores the animation configuration file in the application data of the first application, parses the animation configuration file to obtain an animation parameter, and generates the animation model parameter table of the first application. A corresponding animation is displayed based on the animation model parameter table of the first application. When the animation configuration file is updated, the application A and the application B obtain the animation configuration file again for update, and the displayed animations are updated accordingly. Herein, a function of managing, by the electronic device, animations of different applications in a unified manner is implemented.

In a possible implementation, a feature attribute of a fourth animation in the animation model parameter table of the first application is different from a feature attribute of the fourth animation in the animation configuration file; or a value corresponding to a feature attribute of a fourth animation in the animation model parameter table of the first application is different from a value corresponding to the feature attribute of the fourth animation in the animation configuration file. Herein, it is described that a feature attribute of an animation in the animation model parameter table of the first application may be different from that in the animation configuration file. Research and development personnel may perform customized modification on the animation model parameter table of the first application without affecting content of the animation configuration file. In other words, embodiments of this application support personalized designs of animations of application software.

In a possible implementation, the method further includes: when a preset rule is met, modifying a value corresponding to a second feature attribute of a fifth animation in the animation configuration file. Herein, it is described that the electronic device may dynamically modify the animation configuration file when the preset rule is met, thereby improving configuration flexibility.

In a possible implementation, the preset rule is that within a preset time period, a quantity of times that a time interval between two adjacent user operations is less than preset time exceeds a threshold. The modifying a value corresponding to a second feature attribute of a fifth animation in the animation configuration file includes: decreasing a value corresponding to a duration attribute of the fifth animation in the animation configuration file, where the second feature attribute includes the duration attribute. Herein, the electronic device collects statistics on an interval between two adjacent operations of a user, and may determine a preference and a personality of the user based on the statistics. For example, the personality of the user is to pursue efficiency, and the electronic device may decrease the value corresponding to the duration attribute in the animation configuration file by some. A more user-friendly design is provided.

In a possible implementation, the preset rule is that when current time is within a first time period, the animation configuration file is a first configuration; and when the current time is within a second time period, the animation configuration file is a second configuration, where a value corresponding to a duration attribute of the fifth animation in the first configuration is less than a value corresponding to the duration attribute of the fifth animation in the second configuration, and the second feature attribute includes the duration attribute. Herein, the first time period may be, for example, daytime, and the second time period may be, for example, nighttime. In the daytime, a user is busier and pursues efficiency. In this case, the value corresponding to the duration attribute in the animation configuration file may be shorter than that in the nighttime. The user is more relaxed in the nighttime. In this case, the electronic device may increase the value corresponding to the duration attribute in the animation configuration file by some. Herein, a more user-friendly design is provided.

According to a third aspect, an embodiment of this application provides a computer storage medium, including computer instructions. When the computer instructions are run on an electronic device, a communication apparatus is enabled to perform the animation processing method according to any possible implementation of any one of the foregoing aspects.

According to a fourth aspect, an embodiment of this application provides a computer program product. When the computer program product runs on a computer, the computer is enabled to perform the animation processing method according to any possible implementation of any one of the foregoing aspects.

BRIEF DESCRIPTION OF THE DRAWINGS

FIG. 5 shows four Bezier curves in an animation configuration file according to an embodiment of this application;

FIG. 15 is a schematic diagram of an animation configuration file according to an embodiment of this application.

DETAILED DESCRIPTION OF ILLUSTRATIVE EMBODIMENTS

The following clearly describes technical solutions in embodiments of this application in detail with reference to the accompanying drawings. In descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more of the features. In the descriptions of embodiments of this application, unless otherwise specified, "a plurality of" means two or more.

In embodiments of this application, an animation is an interface animation (UI animation). The UI animation may be used to display an application interface more clearly based on a conventional static UI design, thereby improving interaction experience between a user and the interface. Different animations may be used for different scenes and interfaces. Functions of the animation include:

1. meeting smooth experience of a basic operation;
2. clearly expressing a level relationship between interfaces when a function is used; and
3. embodying an image and a style of a product, and conveying an emotional expression of an interface operation.

Figure 1A:
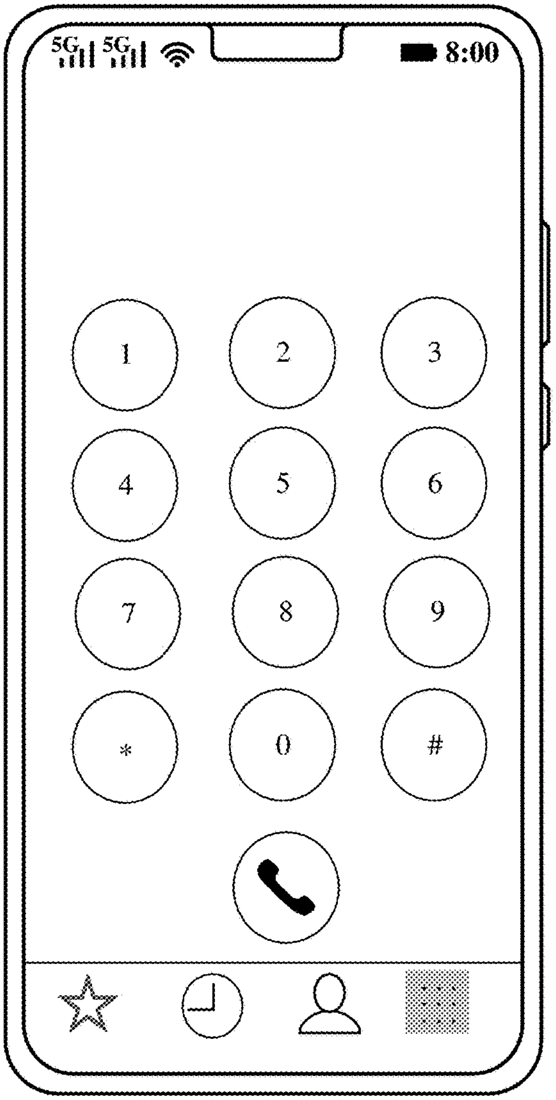
FIG. 1A and FIG. 1B are schematic diagrams of scene interfaces of an animation processing method in a related technology according to an embodiment of this application.
Figure 1B:
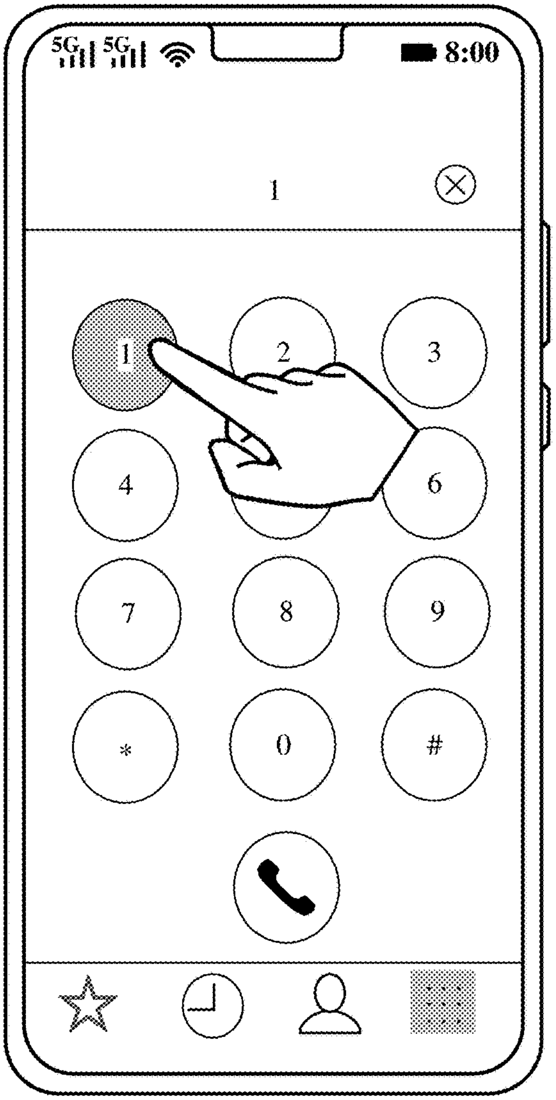

For example, an animation is added for tapping of each digit button on a dialing interface. When the user taps a digit button, the digit button displays a tapped animation. FIG. 1A shows an example of the dialing interface. When the user taps a digit button "1", as shown in FIG. 1B, an icon of the digit button "1" turns gray, indicating that the digit button "1" is tapped. Herein, turning gray is an animation, and a tapping action on the digital button is intuitively displayed for the user.

Figure 2A:
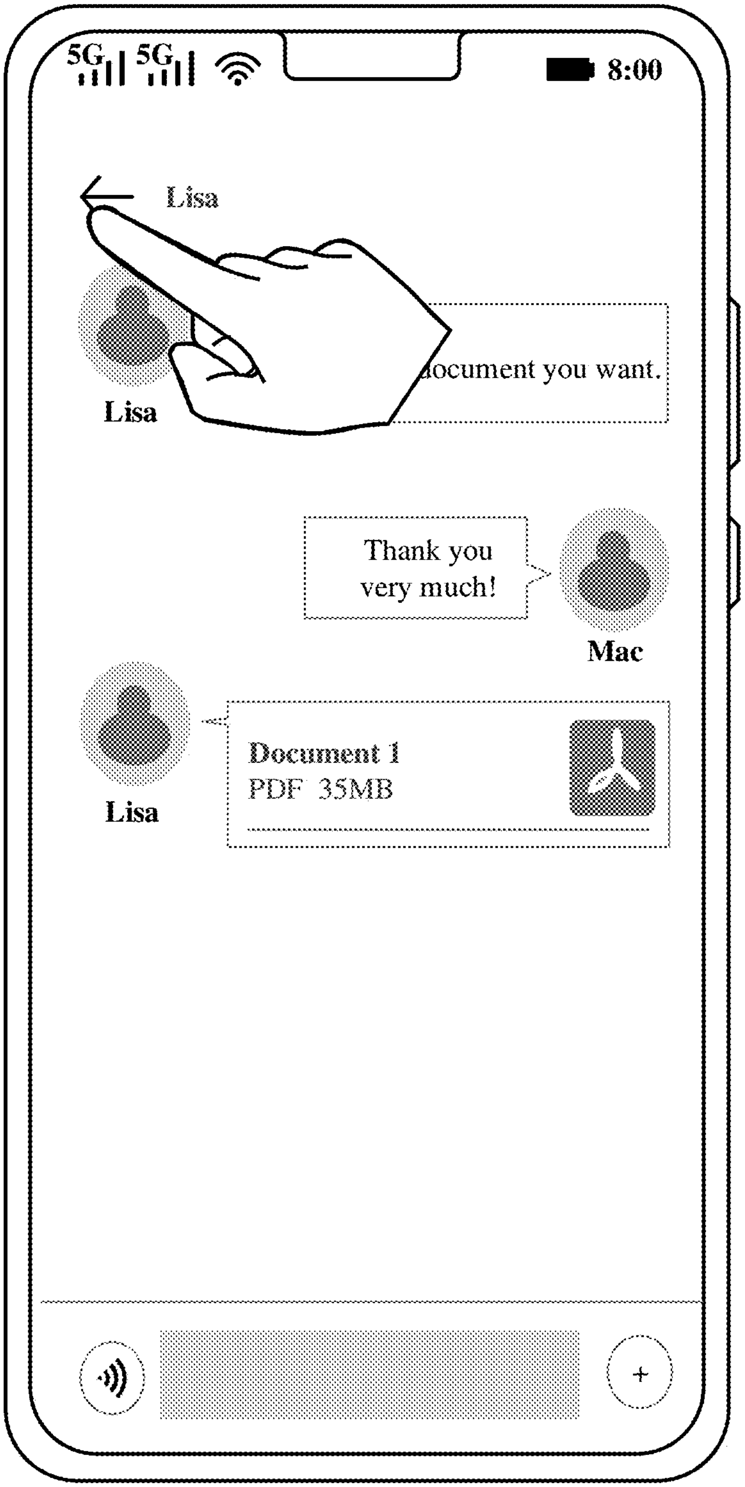
FIG. 2A to FIG. 2C are schematic diagrams of scene interfaces of an animation processing method in another related technology according to an embodiment of this application.
Figure 2B:
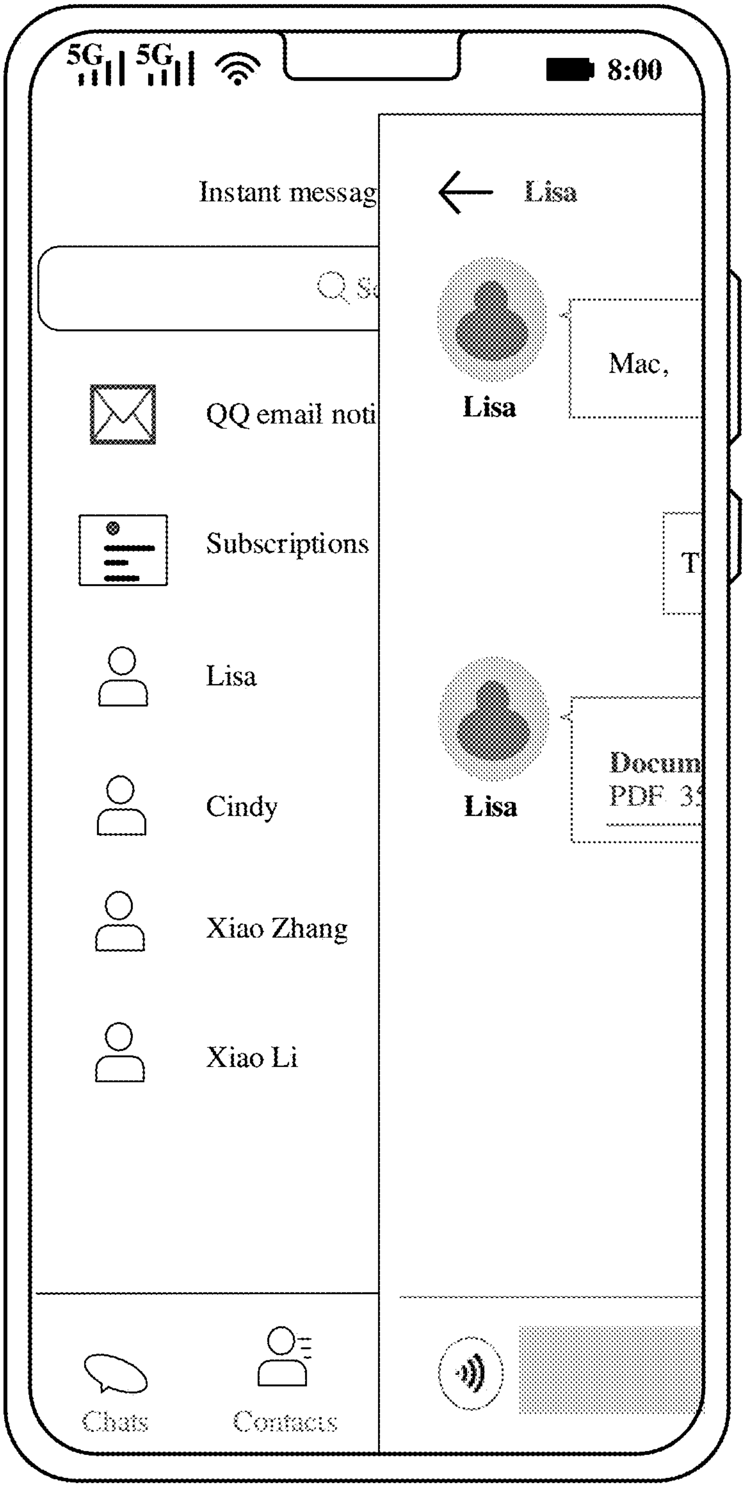
Figure 2C:
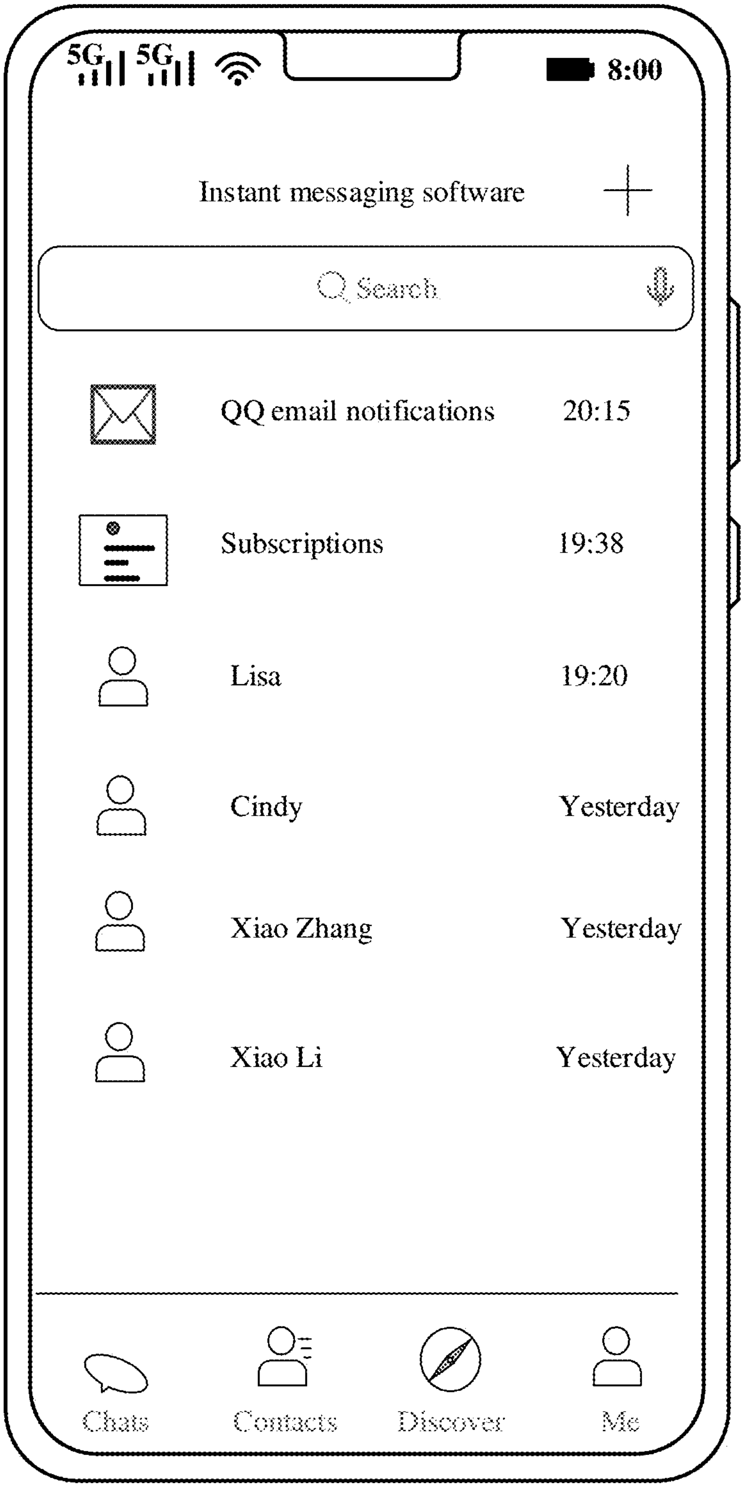

For another example, FIG. 2A shows an example of a dialog box interface of instant messaging software. When the user taps a control for returning to an upper-level interface, as shown in FIG. 2B, the dialog box interface exits by moving rightwards, and then the upper-level interface of the dialog box interface shown in FIG. 2C is displayed. A process from FIG. 2A to FIG. 2C is an animation, and a dynamic exit effect is intuitively displayed for the user.

For another example, an animation is added for selection of an icon on a home screen. When the user touches and holds an icon on the home screen, an editing mode is entered, and all icons on the home screen shake. Herein, shaking is an animation, and an icon currently being in an editable state is intuitively shown to the user. For another example, an entry animation is added for display when an application is started, and an exit animation is added for display when the application is closed.

It can be learned that the animation provides visual feedback. The visual feedback can make the user less sensitive to waiting, strengthen participation by the user, and provide operation guidance for the user. Currently, animations are independent of each other, and are implemented through encoding based on attribute parameters of the animations. Each animation has a separate attribute, and the animation can be executed only after the attribute is defined. The user that wants to modify the animations can only modify a single one. This leads to poor reusability and inheritance between the animations. In addition, animations are also independent from one application to another, and an animation of an application A and an animation of an application B are independent of each other. This leads to management failure for animations of a plurality of applications in a unified manner. Further, for different devices, such as a mobile phone, a tablet, and a watch, an animation of one application is applicable to the mobile phone, but the animation of the same application is not applicable to the watch. In this case, research and development personnel need to define a new set of animations for each application on a different device, with a heavy workload.

Embodiments of this application provide an animation processing method. In the animation processing method, normalization is performed on existing animations based on an animation layered framework, to extract common elements and redefine feature attributes of the animations. The feature attributes are a set of feature attributes summarized from features of the animations, for example, including an animation duration attribute, an animation curve attribute, a frame rate attribute, and the like. The set of feature attributes may be combined into various animations based on different parameters. The existing animations are configured based on the set of feature attributes, so that different animations can be managed in a unified manner. With the animation layered framework, the application research and development personnel can develop and use the animations among all scenes, a plurality of devices, and a plurality of applications based on a template of the animation layered framework. With the animation layered framework, an animation developed on one application can take effect in all scenes, so that the animation can be shared and used between a plurality of devices and between a plurality of applications. The animation layered framework provides the feature attributes of the animations and parameter values, and the applications only need to perform parsing and configurations.

In embodiments of this application, on one hand, time for developing an animation of a same application on different devices by the research and development personnel can be reduced, and on another hand, it is convenient to manage and improve feature attributes of animations of different applications on different devices in a unified manner subsequently. The research and development personnel can modify the animation layered framework at any time, so that the user can immediately experience feedback, thereby improving user experience.

The following describes an electronic device in embodiments of this application. The electronic device in embodiments of this application may be a mobile phone, a television, a tablet computer, a sound box, a watch, a desktop computer, a laptop computer, a handheld computer, a notebook computer, an ultra-mobile personal computer (UMPC), a netbook, a personal digital assistant (PDA), an augmented reality (AR)/virtual reality (VR) device, or the like. A specific type of the electronic device is not specially limited in embodiments of this application.

Figure 3:
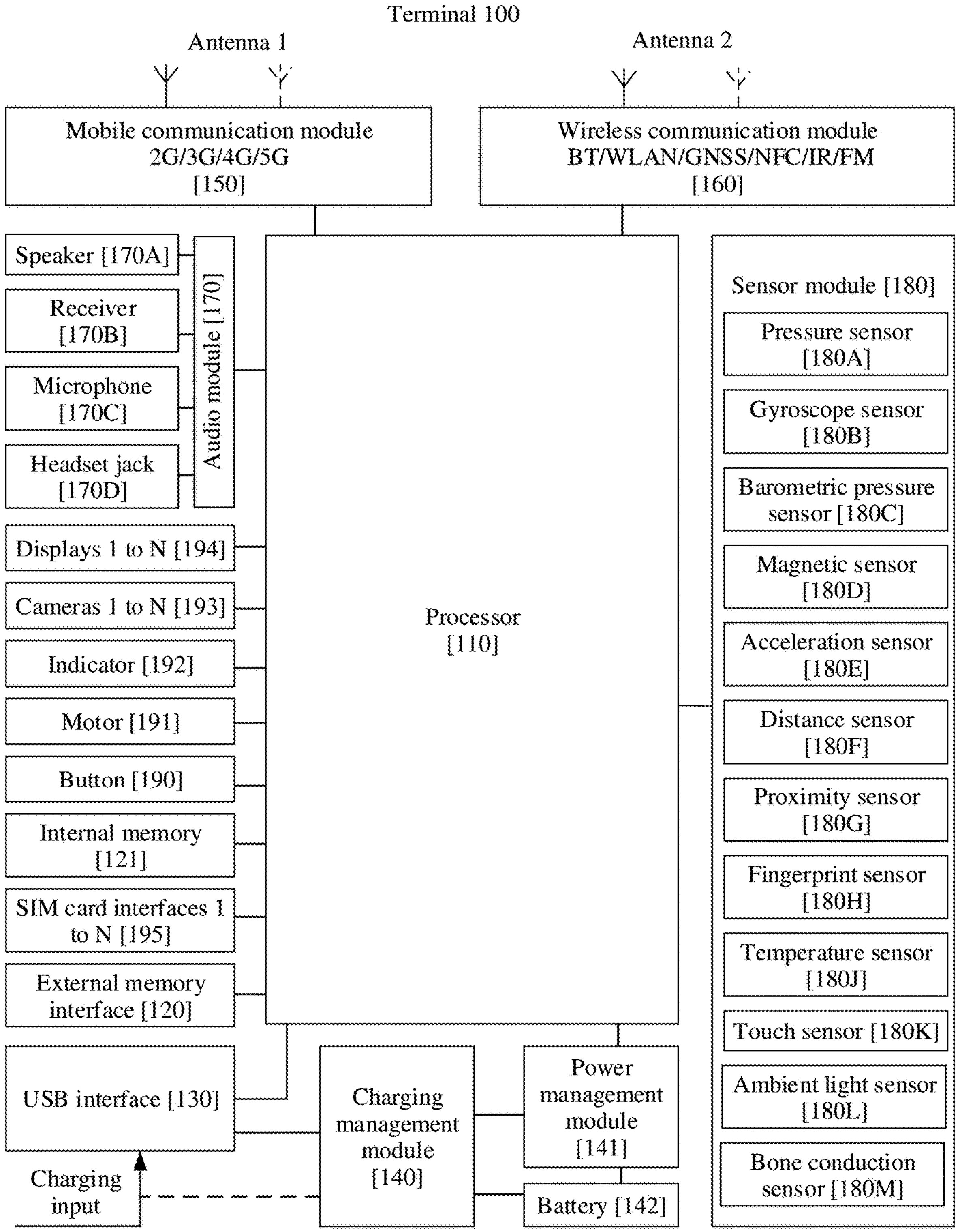
FIG. 3 is a schematic diagram of a hardware structure of an electronic device according to an embodiment of this application.

FIG. 3 is a schematic diagram of a structure of an electronic device 100.

The following uses the electronic device 100 as an example to describe embodiments in detail. It should be understood that the electronic device 100 shown in FIG. 3 is merely an example, and the electronic device 100 may have more or fewer components than those shown in FIG. 3, or may combine two or more components, or may have different component configurations. Various components shown in the figure may be implemented in hardware including one or more signal processing and/or application-specific integrated circuits, software, or a combination of hardware and software.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may further be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that an interface connection relationship between the modules that is shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device 100. The charging management module 140 may further supply power to the electronic device 100 through the power management module 141 while charging the battery 142.

The power management module 141 is configured to be connected to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may be alternatively disposed in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may further be multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a solution that is applied to the electronic device 100 and that includes wireless communication technologies such as 2G, 3G, 4G, and 5G. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and is then transferred to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another function module.

The wireless communication module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 100. The wireless communication module 160 may be one or more components integrating at least one communication processing module. The wireless communication module 160 receives an electromagnetic wave through the antenna 2, performs frequency modulation and filtering on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function through the GPU, the display 194, the application processor, and the like. The GPU is a microprocessor for image processing, and connects the display 194 to the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scene. In some embodiments, the ISP may be disposed in the camera 193.

The camera 193 is configured to capture a static image or a video. An optical image of an object is generated through the lens, and is projected onto the photosensitive element. The light-sensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like an RGB format or a YUV format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy, or the like.

The video codec is configured to compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, voice recognition, and text understanding.

The internal memory 121 may include one or more random access memories (RAM) and one or more non-volatile memories (NVM).

The random access memory may include a static random access memory (SRAM), a dynamic random access memory (DRAM), a synchronous dynamic random access memory (SDRAM), a double data rate synchronous dynamic random access memory (DDR SDRAM, for example, a 5th generation DDR SDRAM is usually referred to as a DDR5 SDRAM), and the like.

The non-volatile memory may include a magnetic disk storage device and a flash memory.

The flash memory may be classified into an NOR flash, an NAND flash, a 3D NAND flash, and the like according to an operation principle; may be classified into a single-level cell (SLC), a multi-level cell (MLC), a triple-level cell (TLC), a quad-level cell (QLC), and the like based on a quantity of electric potential levels of a cell; or may be classified into a universal flash storage (UFS), an embedded multimedia card (eMMC), and the like according to storage specifications.

The random access memory may be directly read and written by the processor 110, may be configured to store an executable program (for example, machine instructions) of an operating system or another running program, may be further configured to store data of a user and an application, and the like.

The non-volatile memory may also store an executable program, data of a user and an application, and the like, and may be loaded to the random access memory in advance for the processor 110 to directly perform reading and writing.

The external memory interface 120 may be configured to connect to an external non-volatile memory, to extend a storage capability of the electronic device 100. The external non-volatile memory communicates with the processor 110 through the external memory interface 120, to implement a data storage function. For example, files such as music and videos are stored in the external non-volatile memory.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may further be configured to encode and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When a call is answered or voice information is received by using the electronic device 100, the receiver 170B may be put close to a human ear to receive a voice.

The microphone 170C, also referred to as a "mike" or a "mic", is configured to convert a sound signal into an electrical signal. When making a call or sending voice information, the user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal and reduce noise. The microphones may further identify a sound source, to implement a directional recording function, and the like.

The headset jack 170D is configured to connect to a wired headset. The headset jack 170D may be the USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The gyroscope sensor 180B may be configured to determine a motion posture of the electronic device 100. The barometric pressure sensor 180C is configured to measure barometric pressure. The magnetic sensor 180D includes a Hall sensor. The acceleration sensor 180E may detect accelerations in various directions (usually on three axes) of the electronic device 100. The distance sensor 180F is configured to measure a distance. The electronic device 100 may measure the distance in an infrared manner or a laser manner. The optical proximity sensor 180G may include, for example, a light-emitting diode (LED) and an optical detector, for example, a photodiode. The ambient light sensor 180L is configured to sense ambient light brightness. The electronic device 100 may adaptively adjust brightness of the display 194 based on the sensed ambient light brightness. The fingerprint sensor 180H is configured to collect a fingerprint. The temperature sensor 180J is configured to detect a temperature. The touch sensor 180K may also be referred to as a “touch panel”. The touch sensor 180K may be disposed on the display 194. The touch sensor 180K and the display 194 form a touchscreen, which is also referred to as a “touch screen”. The touch sensor 180K is configured to detect a touch operation performed on or near the touch sensor 180K. The bone conduction sensor 180M may obtain a vibration signal.

The button 190 includes a power button, a volume button, and the like. The button 190 may be a mechanical button or a touch button. The electronic device 100 may receive a key input, and generate a key signal input related to a user setting and function control of the electronic device 100.

The motor 191 may generate a vibration prompt.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1.

The following describes an architecture of a software system of an electronic device according to an embodiment of this application.

A software system of the electronic device 100 may use a layered architecture, an event-driven architecture, a microkernel architecture, a microservice architecture, or a cloud architecture. In this embodiment of the present invention, the layered architecture is used as an example to describe a software structure of the electronic device 100.

Figure 4A:
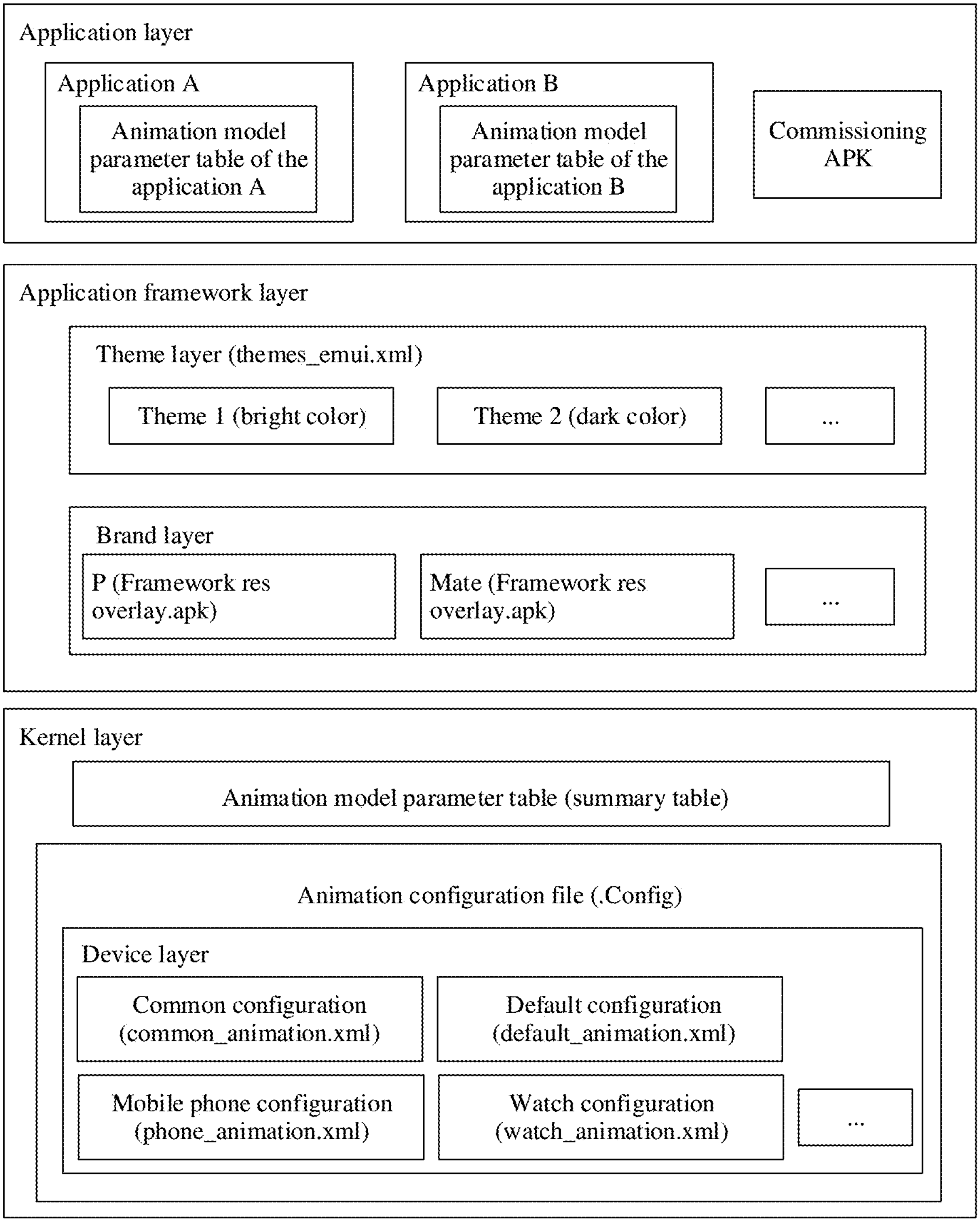
FIG. 4A is a schematic diagram of an architecture of a software system of an electronic device according to an embodiment of this application.

FIG. 4A is a block diagram of a software architecture of the electronic device 100 according to an embodiment of this application. In the layered architecture, software is divided into several layers, and each layer has a clear role and task. The layers communicate with each other through a software interface, a callback, a service, or the like. In some embodiments, a system of the electronic device may be divided into an application layer, an application framework layer, and a kernel layer.

The application layer may be configured to implement management and interface operations on a peripheral device. The application layer may include a series of application packages, and applications include a system application and a third-party application. In this embodiment of this application, two applications, an application A and an application B, are used as examples. The application A and the application B may be applications such as Camera, Gallery, Calendar, Phone, Maps, Navigation, WLAN, Bluetooth, Music, Videos, Messaging, Email, Browser, and Contacts.

The application A includes an animation model parameter table of the application A, and the application B includes an animation model parameter table of the application B. The animation model parameter table of the application A includes animation templates or animation parameters correspondingly displayed by the application A in various scenes, and the animation model parameter table of the application B includes animation templates or animation parameters correspondingly displayed by the application B in various scenes. Animation model parameters of the application A and the application B are obtained based on an animation configuration file at the kernel layer. After obtaining the animation configuration file, the applications (the application A and the application B) store the animation configuration file in application data, parse the animation configuration file, and directly store the animation configuration file as animation model parameter tables of the applications for invocation. Alternatively, the applications may modify, add, or delete the animation configuration file in a customized manner based on a feature attribute of an animation provided in this embodiment of this application, and then generate animation model parameter tables of the applications for invocation.

In this embodiment of this application, the application layer further includes a commissioning APK, and the commissioning APK is used to update or replace the animation configuration file. The commissioning APK supports query of scenes and a list of animation parameters corresponding to the scenes. The animation parameters can be modified and stored in a ROM memory, to overwrite res resources for the scenes to take effect.

The commissioning APK provides query, modification, and validation capabilities. Research and development personnel may adjust different parameters by using the commissioning APK. The electronic device 100 queries, based on the commissioning APK, a parameter that needs to be modified, enters a parameter value that is expected to be modified to, and then generates a new animation configuration file to replace an existing animation configuration file. The new animation configuration file takes effect after being replaced as a system version of the electronic device 100.

The commissioning APK may read animation configuration files of all current scenes and support modification and overwriting.

The application framework layer provides an application programming interface (API) and a programming framework for an application at the application layer. The application framework layer includes some predefined functions.

In this embodiment of this application, the application framework layer further includes a series of parameter definitions associated with different themes and different brands.

For a theme configuration, the themes may include, for example, a bright theme and a dark theme. An animation configuration file of a theme includes a series of animation parameters. When the electronic device 100 selects one of the themes, the electronic device invokes the animation configuration file at the kernel layer based on an animation parameter associated with the theme. For example, in different themes, parameter values invoked by a color attribute of an animation in a same scene are different.

For a brand configuration, the brands may include, for example, Huawei Mate series and P series. A brand configuration includes an overlay configuration project, and may support a layered configuration of aniverylam and interpolators of different brands and products.

The kernel layer is an internal core program of an operating system, and may be configured to externally provide core management invocation of the electronic device. The kernel layer includes at least a display driver, a camera driver, an audio driver, and a sensor driver. Code of the operating system may be divided into a plurality of parts. Address space in which a kernel is located may be referred to as kernel space.

In this embodiment of this application, the kernel layer includes the animation configuration file. The animation configuration file is used to store configuration information of an animation. The animation configuration file provides a feature attribute parameter (a duration parameter, a curve parameter, a frame rate parameter, and the like) and an animation template (for example, including a physical engine, a system animation, a control animation, a feature animation, an application animation, and the like) of the animation.

The application layer may read the animation configuration file at the kernel layer for invocation. For example, the electronic device 100 runs the application A, and the application A invokes and parses the animation configuration file, and generates the animation model parameter table of the application based on a parsed animation configuration file. In this case, the application A needs to display an entry animation of the application A. The electronic device 100 determines, based on the animation model parameter table of the application A, that an animation parameter corresponding to the entry scene animation of the application A is an entry animation template, and obtains the entry animation template, to display the entry animation of the application A. For another example, the electronic device 100 determines, based on the animation model parameter table of the application A, that an animation parameter corresponding to the entry scene animation of the application A includes a series of feature attribute parameters, to display the entry animation of the application A.

The application framework layer may read the animation configuration file at the kernel layer for invocation. For example, a control is associated with the feature attribute parameter of the animation, and the control animation in the animation configuration file may be invoked through an interface. The system of the electronic device 100 may invoke the system animation in the animation configuration file through an interface.

For different devices, this embodiment of this application provides different animation configuration files. For example, the devices may include electronic devices such as a mobile phone, a watch, or a tablet. An animation configuration file of a device may support an animation parameter configuration of the device, for example, including a parameter configuration in a res, vendor res, or overlay project directory. In this embodiment of this application, the animation configuration file for the device includes a common configuration file and a feature configuration file. The common configuration file (common_animation.xml shown in FIG. 4A) is applicable to all scenes, and no device type is distinguished. The feature configuration file is a differentiated configuration for different device types. The feature configuration file includes, for example, a default configuration file (default_animation.xml shown in FIG. 4A), a large-screen configuration file, a mobile phone configuration file (phone_animation.xml shown in FIG. 4A), a television configuration file, a car configuration file, a watch configuration file (watch_animation.xml shown in FIG. 4A), a PC configuration file, and a tablet configuration file. For different device types, the common configuration file and a corresponding feature configuration file are installed at the kernel layer. For example, a kernel layer of the mobile phone includes the common configuration file and the mobile phone configuration file, and a kernel layer of the watch includes the common configuration file and the watch configuration file. Because animation configuration files of different device types are different, animations invoked by a same animation model parameter table on the mobile phone and the watch are different. For example, in the animation model parameter table of the application A, the entry scene animation of the application A is the entry animation template. The mobile phone needs to invoke the entry animation template in the mobile phone configuration file, to display the entry animation of the application A on a display of the mobile phone. The same application A is installed on the watch. Based on the animation model parameter table of the same application A, the watch needs to invoke the entry animation template in the watch configuration file, to display the entry animation of the application A on a display of the watch. This is the same for other devices. In other words, the application (for example, the application A) may use only one animation model parameter table, to implement sharing and use of the animation model parameter table between a plurality of devices, thereby reducing manpower input of the application research and development personnel and improving development efficiency.

The kernel layer further includes an animation model parameter table, and the animation model parameter table is used to maintain and manage the animations. It should be noted that, different from the animation model parameter table at the application layer, the animation model parameter table at the kernel layer is a summary table, and the animation model parameter table includes all animation templates and feature attribute parameters of animations provided by the electronic device 100. For ease of description, the animation model parameter table at the kernel layer may be referred to as the summary table below.

The animation configuration file at the kernel layer corresponds to the summary table, but presentation manners are different. The summary table may be considered as a simple description of the animation configuration file, so that the research and development personnel can configure the animation model parameter table of the application. The animation configuration file is synchronized with the summary table. When the summary table is updated, the animation configuration file is updated accordingly. When the animation configuration file is updated, the summary table is updated accordingly.

The following describes a working process of software and hardware of the electronic device 100 by using an example with reference to a scene in which the entry animation of the application A is displayed.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a touch operation, and a control corresponding to the touch operation is a control of an application icon of the application A. The application A invokes, based on the animation model parameter table of the application A, the entry animation in the animation configuration file at the kernel layer, and invokes the display driver to display the entry animation of the application A on the display 194.

In this embodiment of this application, the electronic device 100 provides the animation configuration file applicable to animation invocation of a system, a control, and an application. For applications, for example, the application A and the application B, the application A and the application B obtain the animation configuration file at the kernel layer and store the animation configuration file to the application data of the applications, parse the animation configuration file to obtain animation parameters, and generate the animation model parameter tables of the applications. Corresponding animations are displayed based on the animation model parameter tables of the applications. When the animation configuration file is updated, the application A and the application B obtain the animation configuration file again for update, and the displayed animations are updated accordingly. Herein, a function of managing, by the electronic device 100, animations of different applications in a unified manner is implemented.

In some embodiments, different applications may perform customized configurations on animation model parameter tables of the applications based on the summary table. The customized configuration herein is only for the animation model parameter table of the application, and does not involve the summary table and the animation configuration file at the kernel layer of the electronic device 100.

In addition to the application animation, the system animation and the control animation of the electronic device 100 are also displayed based on invocation of the animation configuration file at the kernel layer. Animation configuration files of the application animation, the system animation, the control animation, and the like are all configured based on one parameter framework. The following describes the parameter framework in the animation configuration file.

Figure 4B:
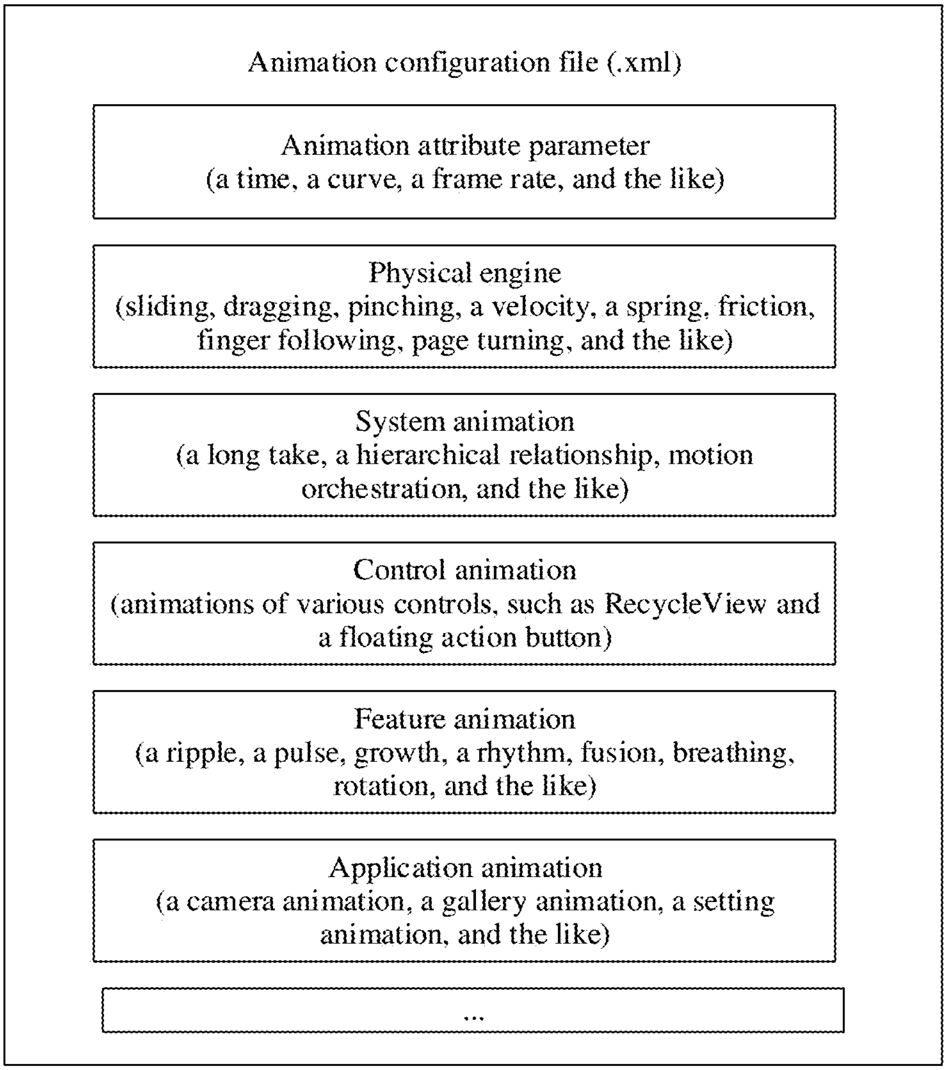
FIG. 4B is a schematic diagram of an architecture of an animation configuration file according to an embodiment of this application.

As shown in FIG. 4B, an animation configuration file may include animation feature attributes (a duration attribute, a curve attribute, a frame rate attribute, and the like), parameters corresponding to the feature attributes, a physical engine (sliding, dragging, pinching, a velocity, a spring, friction, finger following, page turning, and the like), a system animation (a long take, a hierarchical relationship, motion orchestration, and the like), a control animation (animations of various controls, such as RecycleView and a floating action button), a feature animation (a ripple, a pulse, growth, a rhythm, fusion, breathing, rotation, and the like), and an application animation (a camera animation, a gallery animation, a setting animation, and the like), and the like.

The animation feature attributes are a set of feature attributes summarized from features of animations, for example, including the animation duration attribute, the animation curve attribute, the frame rate attribute, and the like. The set of feature attributes may be combined into various different animations. In other words, when different animation duration, animation curves, frame rates, and the like are configured, combined animations are accordingly different. The research and development personnel may configure animation feature attribute parameters as required. The physical engine, the system animation, the control animation, the feature animation, the application animation, and the like may be considered as an animation template. The animation template is a fixed combination preset based on an animation feature attribute, for example, including the physical engine, the system animation, the control animation, and the feature animation, and the like.

In the animation configuration file, each animation feature attribute of an animation may include three fields: a name, a type, and a value. The name is an identity name of the attribute. For example, the duration attribute corresponds to a name, and the curve attribute corresponds to another name. The name may be implemented in a dictionary encoding manner of xxx.xxx.xxx. The type is a data type that needs to be defined in an encoding implementation, namely, a Java language variable type, and usually includes int, float, double, and the like. Each name may correspond to one or more "values", and each "value" indicates a corresponding value. In this embodiment of this application, the value indicated by the "value" may be a variable or a fixed value. An animation model parameter table is finally generated for all names and "values". For example, a name 1 may represent duration, a name 2 may represent a curve, and a name 3 may represent a frame rate. Values of the "values" corresponding to each name may be different in different scenes.

For animation templates in the animation configuration file, each animation template includes a preset animation feature attribute and a corresponding parameter. For example, an animation template 1 includes a name: open_enter_time, a type: integer, and a value: 300 ms. This indicates that entry duration of the animation template 1 is 300 ms. A third-party application, a system application, or the like of the electronic device 100 may directly invoke the animation template 1, without a need to perform a customized configuration on each animation feature attribute.

In some embodiments, the animation feature attribute in the animation configuration file may correspond to a plurality of parameters. In other words, one name may correspond to one or more "values". For example, a duration parameter of the entry scene animation may be defined as time 1, time 2, or time 3 in the animation configuration file. If the application A needs to invoke the entry animation scene, the application A may determine, from a plurality of parameter values of the duration parameter according to a preset rule, a parameter value to be used. The preset rule may be related to factors such as a use frequency, a priority, a use time period, a use scene, and a use habit of a user. This is not limited in embodiments of this application.

In some embodiments, after obtaining the animation configuration file, the application may directly store the animation configuration file as an animation model parameter table of the application for invocation without modifying the animation configuration file, or may customize the animation configuration file based on an animation feature attribute parameter, and then generate an animation model parameter table of the application for invocation.

In some embodiments, the animation feature attribute in the animation model parameter table may correspond to a plurality of parameters. For example, a duration parameter of the entry scene animation may be defined as time 1, time 2, or time 3 in the animation model parameter table of the application A. The application A may determine, from a plurality of parameter values of the duration parameter according to a preset rule, a parameter value to be used. The preset rule may be related to factors such as a use frequency, a priority, a use time period, a use scene, and a use habit of a user. This is not limited in embodiments of this application.

In some embodiments, a name corresponding to each animation feature attribute in the animation configuration file is fixed, but values of "values" may be different. When an animation of an application is designed, a value of a related "value" may be obtained from the animation configuration file in the electronic device 100. For example, the entry scene animation of the application A is customized based on the animation feature attribute parameter in the animation configuration file. The duration parameter is used as an example. Duration parameters in the animation configuration file include the time 1, the time 2, the time 3, and the like. In this case, the duration parameter of the entry scene animation may be defined as the time 1 in the animation model parameter table of the application A. The time 1, the time 2, the time 3, or the like may be a variable or a fixed value. When the time 1 in the animation configuration file is 10 ms, duration of displaying the entry animation by the electronic device 100 is 10 ms. When the time 1 in the animation configuration file is updated to 20 ms, a value of a "value" corresponding to the name 1 is 20 ms, and duration of displaying the entry animation by the electronic device 100 is 20 ms. Optionally, the value indicated by the "value" may alternatively be a fixed value. For example, in a scene of the entry animation, a value of a "value" that corresponds to the name 1 and that is obtained by using the animation model parameter table is 10 ms. In this case, duration of displaying the entry animation by the electronic device 100 is 10 ms.

In conclusion, embodiments of this application provide an animation configuration file applicable to a plurality of applications and a plurality of devices, and the animation configuration file provides specific parameters of animations. The animation configuration file includes a common configuration file and a feature configuration file, and the feature configuration file is applicable to different device types. In the animation model parameter table of the application, the animation configuration file may be directly used or may be customized as required. For example, for an entry scene, an animation of the entry scene may be defined as an entry animation template provided in the animation configuration file, or an animation feature attribute of the entry scene may be defined to implement customization of the animation.

The following describes in detail the specific parameters provided in the animation configuration file. The animation configuration file provides the animation template and the animation feature attribute parameter. An application, a system, a control, or the like of the electronic device may invoke the animation feature attribute parameter based on the animation configuration file, or may directly invoke the animation template. The animation template includes the physical engine (the sliding, the dragging, the pinching, the velocity, the spring, the friction, the finger following, the page turning, and the like), the system animation (the long take, the hierarchical relationship, the motion orchestration, and the like), the control animation (animations of various controls), the feature animation (the ripple, the pulse, the growth, the rhythm, the fusion, the breathing, the rotation, and the like), the application animation (the camera animation, the gallery animation, the setting animation, and the like), and the like. The animation feature attribute parameter includes the duration parameter, the curve parameter, the frame rate parameter, and the like.

1. Feature Attribute of an Animation

In this embodiment of this application, a common element-level design of the animation includes a curve design, a duration design, and a frame rate design, and these attributes are basic elements that constitute animation designs of all scenes.

(1) Curve Design (Curve Design)

A curve and time cooperate with each other to produce a sense of rhythm of a motion. The curve is adjusted, so that an object can accelerate and decelerate, instead of moving at a constant rate. A physical curve may implement acceleration and deceleration matching (a direction, a velocity, and a displacement distance) between a page and a hand velocity during a gesture operation. Types of curves may be classified into a sliding curve, an elastic curve, a Bezier curve, and the like.

The Bezier curve is mainly used for motion matching during switching between application pages in a fixed scene. The Bezier curve is distinguished by an interpolator. The interpolator is essentially a mathematical function, where a parameter is a floating point number between 0.0 and 1.0, an output value is also a floating point number between 0.0 and 1.0, and a slope of the curve is a velocity. The interpolator indicates change logic of an animation transition from an initial state to a final state, to control a rate of an animation change, so that an animation effect can change at one or more rates of a constant rate, an acceleration rate, a deceleration rate, a parabolic rate, or the like.

Parameters (input and output values) of the interpolator are defined, so that a motion change of the animation can be defined. Each frame of the animation is displayed at specific time between a start and an end. In this case, animation time is converted to a time index, and each point on an animation time axis may be converted to a floating point number between 0.0 and 1.0. Then, the value is used to calculate an attribute transformation of the object. In the case of transformation, on a y-axis, 0.0 corresponds to a start position, 1.0 corresponds to an end position, and 0.5 corresponds to a middle between the start and the end. Values of some interpolators may alternatively be values other than 0 to 1.

As shown in FIG. 5, for example, an embodiment of this application provides four Bezier curves. Interpolators of the four Bezier curves are different. In FIG. 5, a Bezier curve interpolator 20-90 is an interpolator for first acceleration and then deceleration, and it is defined that an animation attempts to start to accelerate at a time point 0.2 and then starts to decelerate at a time point 0.9. A Bezier curve interpolator 33-33 is an interpolator for first acceleration and then deceleration, and it is defined that an animation attempts to start to accelerate at a time point 0.33 and then starts to decelerate at a time point 0.67. A Bezier curve interpolator 0-90 is a deceleration interpolator, and it is defined that an animation starts to decelerate at a time point 0.9. A Bezier curve interpolator 0-100 is a deceleration interpolator, and it is defined that an animation starts to decelerate at a time point 1.

In addition to the four Bezier curves, this embodiment of this application further provides, for example, a Bezier curve including an interpolator 10-90, 20-80, 40-60, 40-90, 70-80, 90-10, or another type of interpolator. Bezier curves applicable to different scenes may be selected based on a requirement. In some scenes, a Bezier curve with an interpolator 40-60 or 33-33 may be used for finger-following sliding, and a Bezier curve with an interpolator 70-80 has a strong rhythm and may be used to a scene in which interestingness is highlighted.

In some embodiments, the interpolator provided in the animation configuration file cannot meet all requirements. Therefore, the electronic device 100 may set change logic of an animation feature attribute value by using a system interpolator or a customized interpolator (for example, an elastic force interpolator or a friction interpolator). When the animation runs and the electronic device 100 determines, based on the change logic, that the animation feature attribute value changes, the electronic device draws a frame image based on the animation feature attribute value, and refreshes a display page.

The sliding curve is commonly used in scenes such as list sliding and page sliding. A common e-negative exponential function used in the sliding curve is a slow attenuation curve, and may be used for attenuation of a velocity or a displacement. A main difference between the sliding curve and the Bezier curve is that the sliding curve has a longer trail, which can compensate for a disadvantage of an original Bezier curve (interpolator).

A design of the elastic curve is to define a simulated curve shape through an attribute interface, and give an element a more real motion state. A physical engine capability of the system can be invoked, and a velocity is used as a finger-following output value. Differentiation may generate different elastic effects, including but not limited to attributes such as a displacement, scaling, a rotation, and transparency, and can compensate for the disadvantage of the original Bezier curve (interpolator).

An example of a preset animation curve in the animation configuration file is shown in the following Table 1.

TABLE 1

| Corresponding Java class | Function | Calculation formula |
|---|---|---|
| Accelerateinterpolator | Perform animation acceleration, where a power value may be set | Power operation: return Math.pow(input, mdoublefactor) |
| Overshootinterpolator | Quickly complete the animation and display an end style after the animation overshoots the end point | $3^{rd}$ power + offset return t * t * ((mtension + 1) * t + mtension) + 1.0f; |
| Acceleratedecelerate-interpolator | First accelerate and then decelerate | Cosine function: return Math.cos((input + 1) * Math.PI)/2.0f) + 0.5f |
| Anticipateinterpolator | First step back and then accelerate forward | $3^{rd}$ power + offset: return t * t * ((mtension + 1) * t − mtension); |
| Anticipateovershoot-interpolator | First step back and then accelerate forward, and return to an end point after the animation overshoots the end | Segment calculation: If (t < 0.5f) return 0.5f * a(t * 2.0f, mtension); Else return 0.5f * (o(t * 2.0f − 2.0f, mtension) + 2.0f); |
| Bounceinterpolator | Display a ball effect in a final stage | T * = 1.1226f; If (t < 0.3535f) return bounce(t); Else if (t < 0.7408f) return bounce(t − 0.54719f) + 0.7f; Else if (t < 0.9644f) return bounce(t − 0.8526f) + 0.9f; Else return bounce(t − 1.0435f) + 0.95f; |
| Cycleinterpolator | Periodically move, where a quantity of periods can be configured | Sine function: return (Math.sin(2 * mcycles * Math.PI * input)); |
| Decelerateinterpolator | Decelerate, where a power may be set | Power operation inversion: return 1.0f − Math.pow((1.0f − input), 2 * mfactor) |
| Linearinterpolator | Keep a constant rate | Return input; |
| Pathinterpolator | Calculate an offset based on a given curve, where the given curve is a Bezier curve in most cases. | |

In this embodiment of this application, various types of attribute information required by an animation scene are set in the animation model parameter table. For example, the name 2 represents a curve. In a sliding animation scene, a value of a "value" that corresponds to the name 2 and that is obtained by using the animation model parameter table is a curve 1. Further, it is obtained from the animation configuration file that the curve 1 is, for example, a function corresponding to an accelerateinterpolator class. The accelerateinterpolator class is invoked, so that the electronic device 100 displays a sliding animation corresponding to the curve 1.

In some embodiments, a same name may correspond to values of a plurality of "values". To be specific, the electronic device 100 obtains, by using the animation model parameter table, that values of "values" corresponding to the name 2 are the curve 1, a curve 2, and a curve 3. The electronic device 100 selects one of the curves according to a preset rule, or may randomly select one of the curves. The preset rule includes, for example, the priority and the use frequency. Further, it is obtained from the animation configuration file that the curve 1 includes two functions, for example, the function corresponding to the accelerateinterpolator class and a function corresponding to an acceleratedecelerateinterpolator class. In this case, the application may select either of the functions according to a preset rule. The preset rule may be related to factors such as the use frequency, the priority, the use time period, the use scene, and the use habit of the user. This is not limited in embodiments of this application.

(2) Duration Design (Animation Duration Design)

Figure 6:
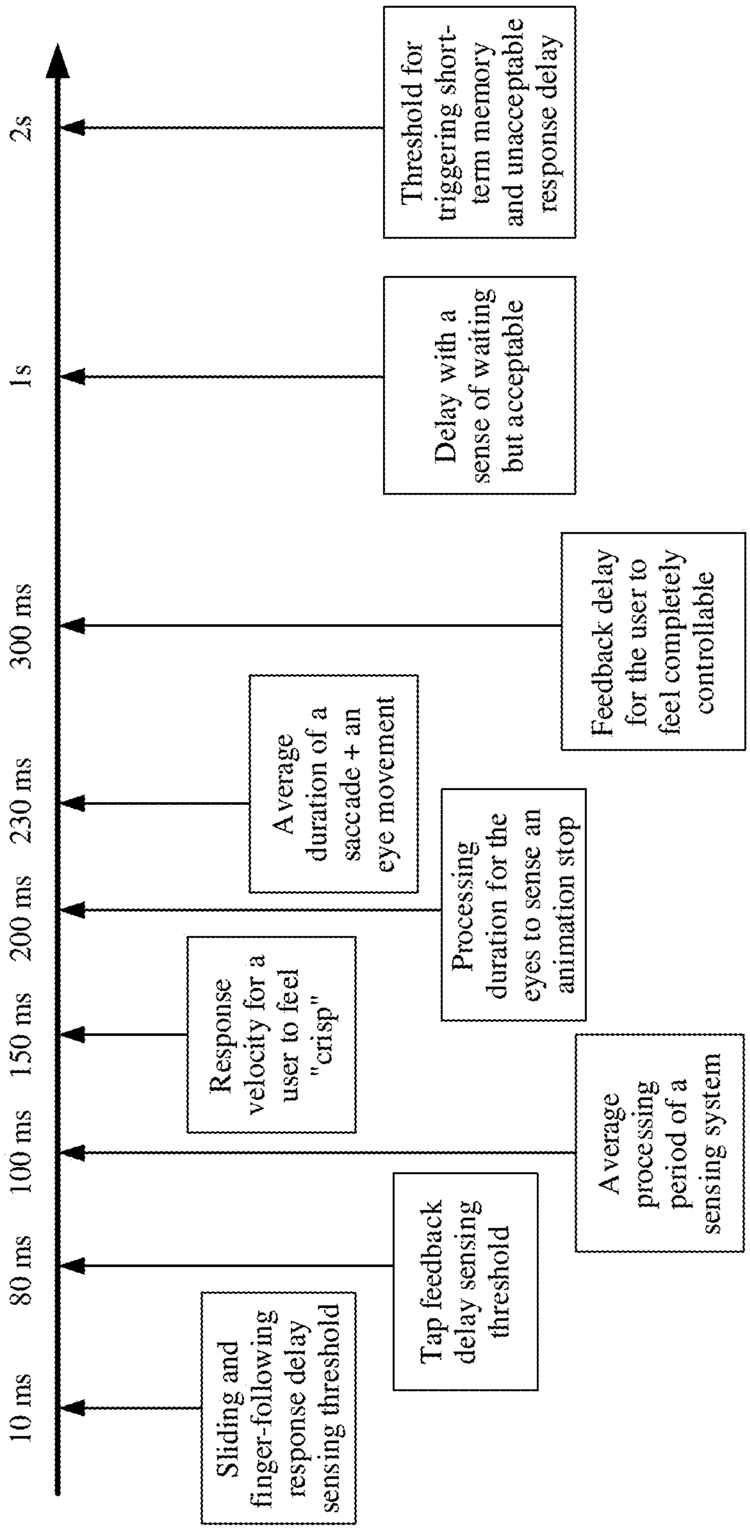
FIG. 6 shows a selection effect of a duration attribute parameter in an animation configuration file according to an embodiment of this application.

The time is a basic element for generating an animation. Different duration is applied to different types of elements and scenes. If the duration is excessively short or excessively long, the user may be uncomfortable. FIG. 6 illustrates an example of how the duration needs to be adjusted to adapt to different types of animations. FIG. 6 shows impact of different duration on user experience, and the duration is selected based on an actual requirement.

For example, for a simple animation, a state change is implemented only by using a color animation, and duration may be set to 100 ms. For a complex animation, a rotation animation needs to be ensured by using appropriate time, and duration may be set to 300 ms. For entry and exit animations, in a same scene, more attention is required for the entry animation, and the attention is transferred to a next task during the exit animation. Therefore, duration of the entry animation may be set to 300 ms, and duration of the exit animation may be set to 250 ms.

For another example, an animation motion is performed in a specific range, and time used for a small-range motion is shorter than that used for a full screen motion. For example, duration of a switch control animation (a small-range motion) may be set to 150 ms, duration of a list deleting animation (a partial-range motion) may be set to 200 ms, and duration of opening an image (a full-screen motion) may be set to 350 ms. In some embodiments, determining may alternatively be performed based on a displacement distance. For example, a short displacement is 150 ms, a medium displacement is 200 ms, and a long displacement is 350 ms.

In this embodiment of this application, various types of attribute information required by an animation scene are set in the animation model parameter table, and specific values of the various types of attribute information are provided in the animation configuration file. For example, the name 1 represents duration, and a parameter value of the duration is placed in commo_animation.xml in the animation configuration file, where animation_short_time=150 ms, animation_middle_time=250 ms, and animation_long_time=350 ms are set. The animation model parameter table of the application A indicates an animation feature attribute of the entry animation and a corresponding parameter, including a duration parameter, a curve parameter, animation content, and the like. The electronic device 100 obtains, by using the animation model parameter table, that a value of a "value" corresponding to the name 1 is animation_short_time, and further obtains, from the animation configuration file, that animation_short_time is 150 ms. Therefore, duration in which the electronic device 100 displays the entry animation is 150 ms.

In some embodiments, for different device types, a specific value of attribute information of an animation in the animation configuration file may be adaptively changed. The animation motion is performed in the specific range, and the time used for the small-range motion is shorter than that used for the full screen motion. Different devices have different values. For example, if a mobile phone is used as a reference object and a system animation of the mobile phone is used as a standard, a larger screen indicates longer motion duration. Table 2 shows examples of duration increase/decrease coefficients of animations of different devices.

TABLE 2

| | Watch (* inches) | Mobile phone (* inches to * inches) | Tablet (* inches) | Large screen (* inches) |
|---|---|---|---|---|
| Duration increase/decrease coefficient | 0.8 | 1 | 1.3 | 1.8 |

For different device types, the feature configuration file in the animation configuration file may reflect different configurations in this case. In the foregoing example, the name 1 represents duration. In the scene of the entry animation, the value of the "value" that corresponds to the name 1 and that is obtained by using the animation model parameter table is animation_short_time. In the mobile phone configuration file (phone_animation.xml), animation_short_time obtained from the mobile phone configuration file is 150 ms; in the watch configuration file (watch_animation.xml), animation_short_time obtained from the watch configuration file is 150×0.8=120 ms; in the tablet configuration file (pad_animation.xml), animation_short_time obtained from the tablet configuration file is 150×1.3=195 ms; in the large-screen configuration file (screen_animation.xml), animation_short_time obtained from the large-screen configuration file is 150×1.8=270 ms; and the like. In other words, the application research and development personnel do not need to perform different configurations on the name 1 of the entry animation for different device types, and only the same animation model parameter table needs to be used, to obtain, from animation configuration files of different device types, a duration parameter applicable to the device, thereby greatly reducing workload.

It may be understood that the duration increase/decrease coefficients of different device types shown in Table 2 are merely examples. In this application, the duration may alternatively be calculated based on a screen size. In other words, a value of a "value" of the duration is related to a length and/or a width of a screen. The screen size may be an actual size of the screen of the electronic device, or may be a size of a display area of the screen of the electronic device.

(3) Frame Rate Design

A frame rate is a device refresh frequency and is closely related to performance of a hardware device. Generally, higher device performance indicates a higher frame rate. For example, a frame rate of a high-end device is 90 FPS/120 FPS, a frame rate of a middle and low-end device is 60 FPS, and a frame rate of a low-end device may be slightly less than 60 FPS. Frame rates of some special devices, for example, a watch, may be less than 30 FPS. In this embodiment of this application, the frame rate is not specifically limited, and the frame rate may be defined for an application based on an actual scene and an actual requirement.

2. Physical Engine

A motion of anything is in accordance with the objective motion law of the physical world. For example, when a basketball falls on the ground, attenuated elasticity is produced. In this way, a product feeling conveyed to the user is soft and elastic. This phenomenon contains a series of physical motion rules, such as elasticity, inertia, gravity, and friction, and includes an animation design generated between a page and a force, a velocity, and inertia of a hand during gesture interaction.

The physical engine may be considered as a curve-based encapsulation, or may be understood as a template preset in the animation configuration file, and may be directly invoked in the animation model parameter table of the application without configuring an animation feature attribute. Alternatively, an attribute parameter of the physical engine may be customized. The electronic device 100 may determine a to-be-invoked physical engine at an engine design layer based on an identified user operation. For example, the electronic device 100 is a mobile phone. The electronic device 100 identifies a sliding operation triggered by the user on a touchscreen, queries a name and a value of a "value" of each attribute corresponding to a sliding animation from the animation model parameter table, and further invokes, from the animation configuration file, a physical engine and an attribute parameter of a sliding design (and/or a spring design, a friction design, or the like), to implement a sliding effect.

Figure 7:
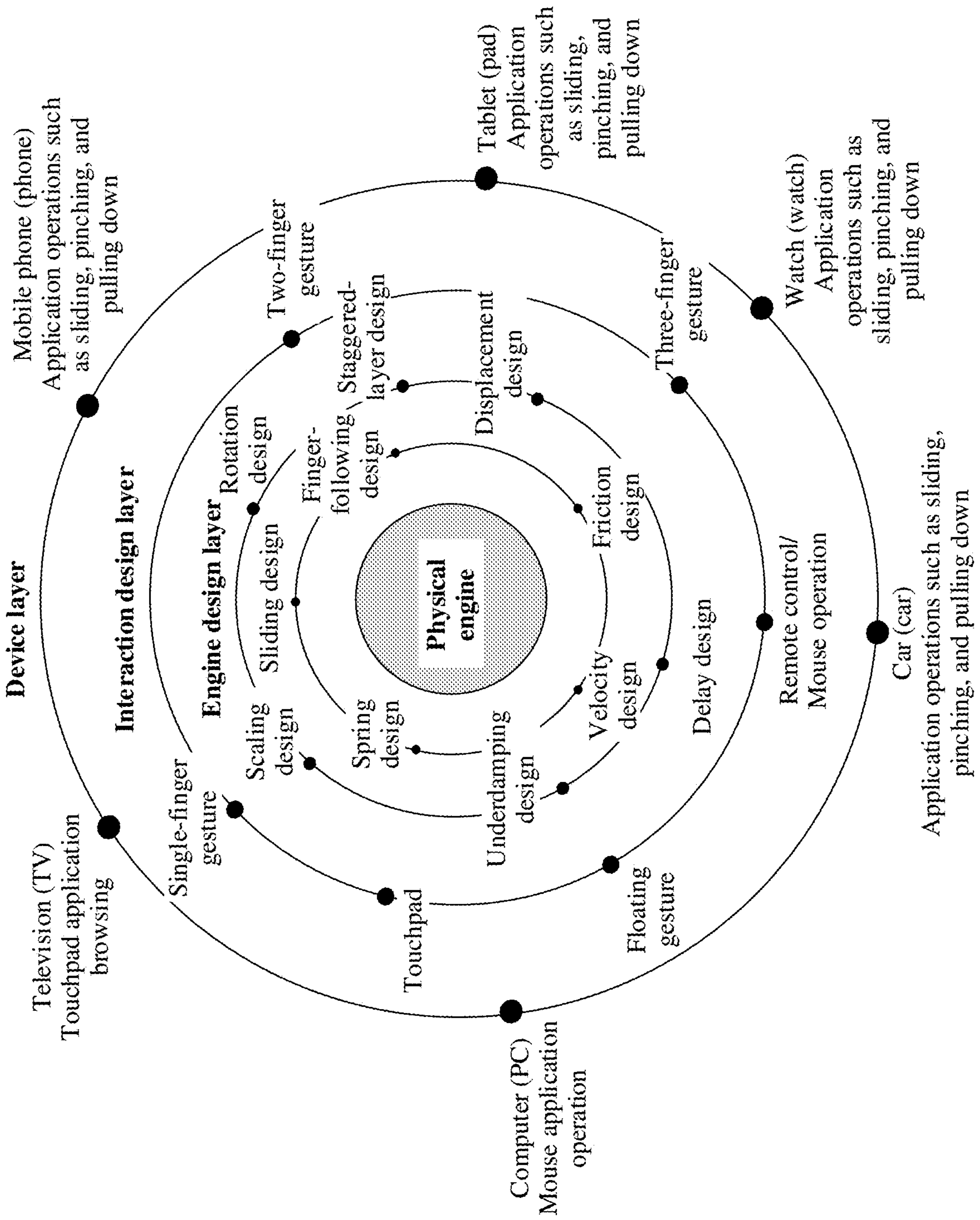
FIG. 7 shows a physical engine in an animation configuration file according to an embodiment of this application.

A range of the physical engine is shown in FIG. 7. FIG. 7 shows an example of an engine design layer, an interaction design layer, and a device layer at a logical layer. The engine design layer includes a spring design, a sliding design, a finger-following design, a friction design, a velocity design, a displacement design, a scaling design, a rotation design, a staggered-layer design, a delay design, an underdamping design, and the like. The interaction design layer includes a touch, a floating gesture, a single-finger gesture, a two-finger gesture, a three-finger gesture, a remoter/mouse, and the like. The device layer includes a mobile phone, a watch, a tablet, a car, a television (TV), a computer (PC), and the like.

The following describes several physical engines in the animation configuration file by using examples.

(1) Elastic Engine

This embodiment of this application provides an example of an elastic force model. An elastic force motion meets damping vibration formulas in the Hucker's law shown in a formula ① and a formula ②.

$$f = ma \quad ①$$

$$-kx - d\frac{dx}{dt} = m\frac{d^2x}{dt^2} \quad ②$$

f is a force in a vibration process, m is a mass, a is an acceleration, k is a stiffness coefficient, x is a spring deformation, d is a damping coefficient, and t is time.

The stiffness coefficient is magnitude of an elastic force required by a unit deformation of a spring. A larger stiffness coefficient k indicates shorter time for the spring to return to an equilibrium position from a maximum amplitude, and vice versa. In some embodiments, a value range of the stiffness coefficient k may be 1 to 99, and a recommended value range of the stiffness coefficient k may be 150 to 400.

The damping coefficient is a quantitative representation of a shock absorption force (for example, fluid resistance and friction) of the spring in the vibration process. The shock absorption force may gradually decrease an amplitude of the spring until the spring stops in the equilibrium position. A larger damping coefficient indicates that the spring stops in the equilibrium position more easily, and vice versa. In some embodiments, a value range of the damping coefficient k may be 1 to 99, and the electronic device 100 may set the damping coefficient based on a specific scene.

Figure 8A:
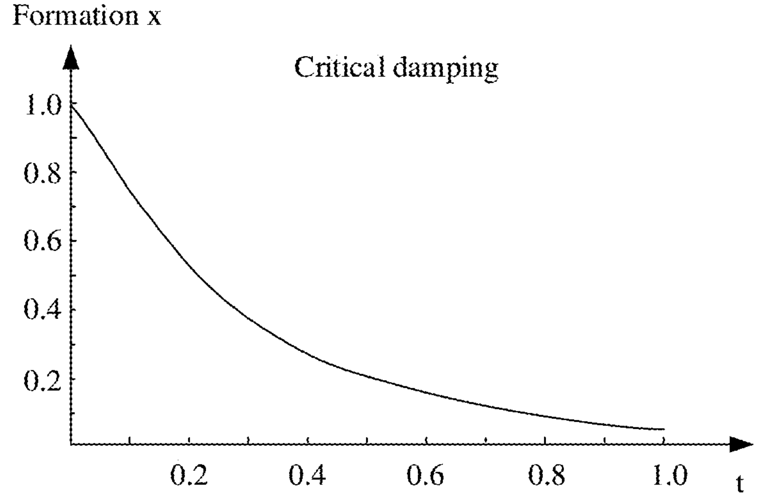
FIG. 8A to FIG. 8C are curve diagrams of a spring deformation and time according to an embodiment of this application.
Figure 8B:
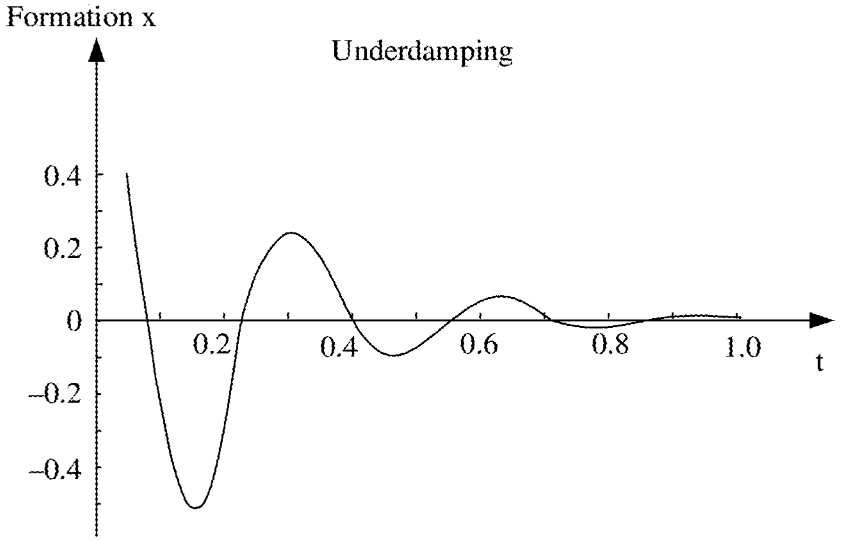
Figure 8C:
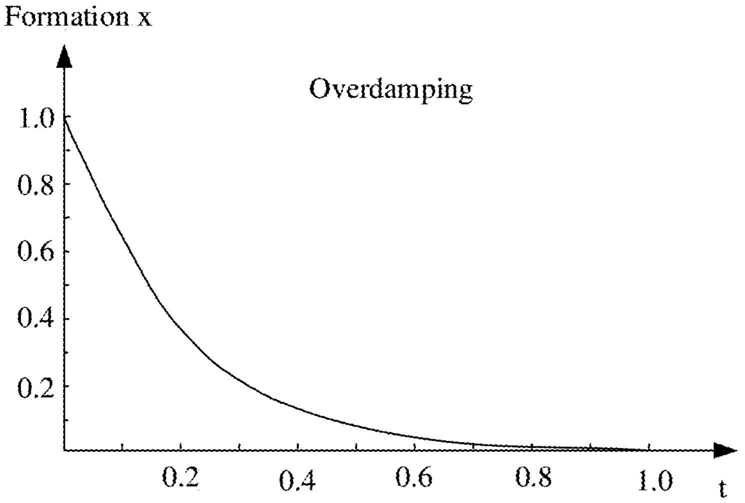

Based on a damping characteristic of the spring, a motion state of the spring may be divided into three states: critical damping, underdamping and overdamping. For example, FIG. 8A to FIG. 8C are curve diagrams of the spring deformation x and the time t in the three states according to an embodiment of this application. Refer to FIG. 8A. In the critical damping state, the spring stops moving and does not oscillate after returning to the equilibrium position at a most stable velocity in shortest time. Refer to FIG. 8B. In the underdamping state, the spring slowly decreases the amplitude gradually through a plurality of oscillations, and finally returns to the equilibrium position. Refer to FIG. 8C. In the overdamping state, the spring almost does not vibrate, and the amplitude gradually decreases, to return to the equilibrium position. In some embodiments, when $d^2=4\times m\times k$, the spring is in the critical damping state, and when $d^2<4\times m\times k$, the spring is in the underdamping state. In other words, when $d^2>4\times m\times k$, the spring is in the overdamping state.

In this embodiment of this application, a pressure and/or a velocity of a user operation determine/determines the spring deformation, and a third-party application may also customize the parameters in the elastic force model.

In some embodiments, for different device types, when the elastic force model is used, requirements for effects of monetizing the spring are also different. Therefore, values of the stiffness coefficient and the damping coefficient need to be different on different devices. Generally, a larger screen indicates a more obvious moving distance, and therefore a more obvious elastic effect of the spring. A larger stiffness/damping conduction coefficient indicates a weaker correlation and a "softer" chain. A smaller stiffness/damping conduction coefficient indicates a stronger correlation, a "harder" chain, and a smaller difference. Therefore, in feature configuration files of different devices, settings of the stiffness/damping conduction coefficient may be different. For example, a mobile phone is used as a reference object, and stiffness/damping conduction coefficients on different devices have different values. Table 3 shows examples of stiffness/damping increase/decrease coefficients of animations of different devices.

TABLE 3

| | Watch | Mobile phone | Tablet | Large screen |
|---|---|---|---|---|
| Stiffness/damping increase/decrease coefficient | 1.2 | 1 | 0.8 | 0.6 |

For different device types, the feature configuration file in the animation configuration file may reflect different configurations in this case. In the foregoing example, a name 4 represents a stiffness/damping coefficient. In a scene in which an elastic animation needs to be invoked, a value of a "value" that corresponds to the name 4 and that is obtained by using the animation model parameter table is animation_spring_k_g_ratio. In the mobile phone configuration file (phone_animation.xml), animation_spring_k_g_ratio obtained from the mobile phone configuration file is 200; in the watch configuration file (watch_animation.xml), animation_spring_k_g_ratio obtained from the watch configuration file is 200×1.2=240 ms; in the tablet configuration file (pad_animation.xml), animation_spring_k_g_ratio obtained from the tablet configuration file is 200×0.8=160; in the large-screen configuration file (screen_animation.xml), animation_spring_k_g_ratio obtained from the large-screen configuration file is 200×0.6=120 ms; and the like. In other words, the application research and development personnel do not need to perform different configurations on the name 4 of the elastic animation for different device types, and only the same animation model parameter table needs to be used, to obtain, from animation configuration files of different device types, a stiffness/damping coefficient that is of the elastic animation and that is applicable to the device, thereby greatly reducing workload.

It may be understood that the stiffness/damping increase/decrease coefficients of different device types shown in Table 3 are merely examples. In this application, the stiffness/damping coefficient may alternatively be calculated based on the screen size. In other words, a value of a "value" of the stiffness/damping coefficient is related to the length and/or the width of the screen. The screen size may be the actual size of the screen of the electronic device, or may be the size of the display area of the screen of the electronic device.

This embodiment of this application provides an example of implementation code of an elastic engine interpolator, as shown in the following:

Public constructors:

Springinterpolator(float stiffness, float damping)

Springinterpolator(float stiffness, float damping, float endpos)

Springinterpolator(float stiffness, float damping, float endpos, float velocity)

Springinterpolator(float stiffness, float damping, float endpos, float velocity, float valuethreshold)

Specifically, an example is as follows:

Physicalinterpolatorbase interpolator=new springinterpolator(400F, 40F, 200F, 2600F, 1F);

Objectanimator animator=objectanimator.offloat(listview, "translationy", 0, 346)

Animator.setduration(interpolator.getduration( ));

Animator.setinterpolator(interpolator);

Animator.start( );

In some embodiments, implementation code of an elastic engine animation class may be shown as follows:

Public constructors:

Hwspringanimation(K object, floatpropertycompat<K> property, float stiffness, float damping, float startvalue, float endvalue, float velocity)

Hwspringanimation(K object, floatpropertycompat<K> property, float stiffness, float damping, float endvalue, float velocity)

Specifically, examples are as follows:

Hwspringanimation animation=hwspringanimation (listview,

Dynamicanimation.TRANSLATION_Y, 400F, 40F, 0, 1000F); Animation.start( );

(2) Friction Engine

The electronic device 100 detects a sliding operation of the user and a sliding velocity of the sliding operation. The electronic device 100 may determine, based on the sliding velocity by using a friction model, a relative displacement S of page sliding, to determine a motion start point and a motion end point of a page. In addition, the electronic device 100 may determine a spring parameter of each page module based on a spring parameter of each module on the page by using a damping conduction algorithm, to further control, based on the spring parameter of each page module, each page module to perform an elastic force model motion in a page sliding process in which a relative displacement is S.

This embodiment of this application provides an example of an exponential function-based friction model. The following formula ③ and formula ④ are function relationships between a velocity V (velocity), a displacement S, and time t in the friction model.

$$V(t) = V_0 \times e^{-4.2 \times f \times t} \quad ③$$

$$S(t) = \left(\frac{V_0}{-4.2 \times f}\right) \times \left(e^{-4.2 \times f \times t} - 1\right) \quad ④$$

$V_0$ is an initial velocity of an object motion, t is time of the object motion, and f is friction (friction) applied in an object motion process.

It may be understood that, larger friction indicates that an object is more likely to stop and a movement distance of the object is shorter, and vice versa. In this embodiment of this application, the friction may be set by the electronic device 100 based on a specific scene, or may be set by default before delivery of the electronic device 100, or may be set by the user.

Figure 9A:
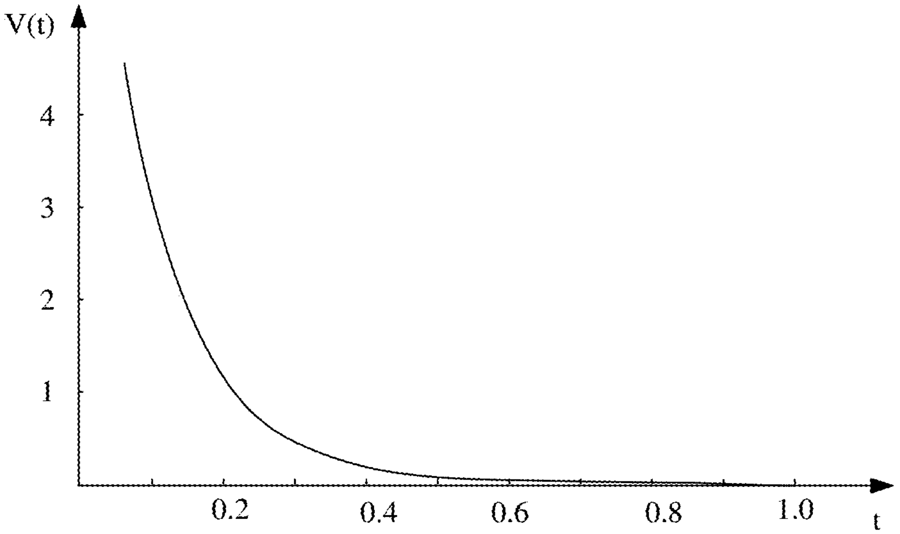
FIG. 9A and FIG. 9B are curve diagrams of a velocity and time in a friction model according to an embodiment of this application.
Figure 9B:
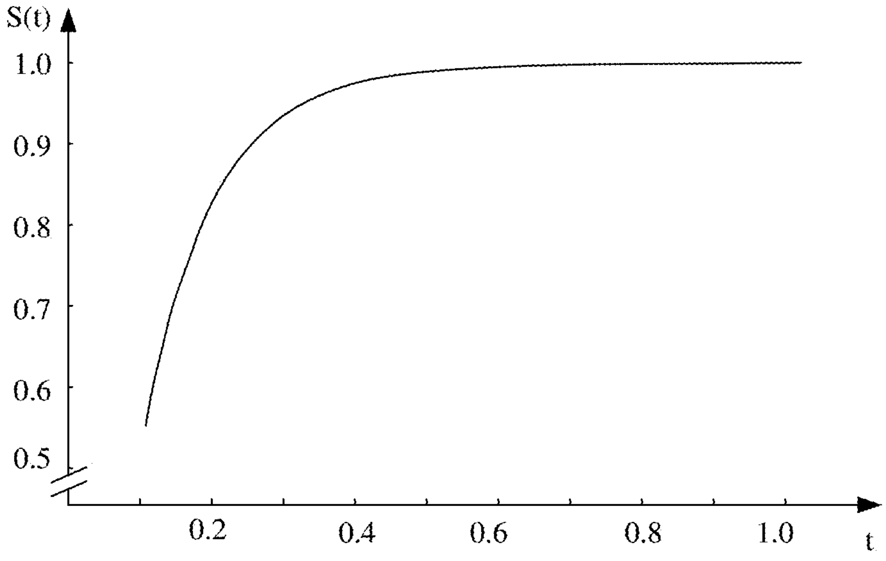

FIG. 9A is a curve diagram of the velocity V and the time t in the friction model according to an embodiment of this application. FIG. 9B is a curve diagram of the displacement S(t) and the time t in the friction model according to an embodiment of this application.

In some embodiments of this application, the electronic device 100 may fit a sliding velocity of the page on the display 194 by using a velocity detection technology (for example, a velocitytracker algorithm), set the sliding velocity to $V_0$, and then determine a relative displacement of page sliding by using at least one of the formula ③ and the formula ④. The sliding velocity may be in a unit of pixels per second.

In this embodiment of this application, a hand velocity of the user operation determines an initial velocity of page sliding. Because the object finally stops, the time t may be calculated, and the displacement of the page is calculated by using the initial velocity Vo and the time t. Optionally, the third-party application may also customize the parameters in the friction model.

In some embodiments, for different device types, when the friction model is used, requirements for effects of monetizing the friction are also different. Therefore, a value of the friction needs to be different on different devices. Generally, a larger screen indicates a more obvious moving distance, and therefore a more obvious effect of the friction. Therefore, in feature configuration files of different devices, settings of a friction coefficient may be different. For example, a mobile phone is used as a reference object, and friction coefficients on different devices have different values. Table 4 shows examples of friction coefficients of animations of different devices.

TABLE 4

| | Watch | Mobile phone | Tablet | Large screen |
|---|---|---|---|---|
| Friction coefficient | 1.2 | 1 | 0.8 | 0.6 |

For different device types, the feature configuration file in the animation configuration file may reflect different configurations in this case. In the foregoing example, a name 5 represents a friction coefficient. In a scene in which a friction animation needs to be invoked, a value of a "value" corresponding to the name 5 is obtained by using the animation model parameter table. A value of a "value" that corresponds to the name 5 and that is obtained from the mobile phone configuration file is 200; a value of a "value" that corresponds to the name 5 and that is obtained from the watch configuration file is 200×1.2=240 ms; a value of a "value" that corresponds to the name 5 and that is obtained from the tablet configuration file is 200×0.8=160; a value of a "value" that corresponds to the name 5 and that is obtained from the large-screen configuration file is 200×0.6=120 ms; and the like. In other words, the application research and development personnel do not need to perform different configurations on the name 5 of the friction animation for different device types, and only the same animation model parameter table needs to be used, to obtain, from animation configuration files of different device types, a friction coefficient that is of the friction animation and that is applicable to the device, thereby greatly reducing workload.

It may be understood that the stiffness/damping increase/decrease coefficients of different device types shown in Table 4 are merely examples. In this application, the friction may alternatively be calculated based on the screen size. In other words, a value of a "value" of the friction coefficient is related to the length and/or the width of the screen. The screen size may be the actual size of the screen of the electronic device, or may be the size of the display area of the screen of the electronic device.

In some embodiments, implementation code of a friction deceleration interpolator may be shown as follows:

```
Public constructors:
Flinginterpolator(float initvelocity,float friction)
Specifically, an example is as follows:
Physicalinterpolatorbase interpolator=new flinginterpolator(600F, 0.5F);
Objectanimator animator=objectanimator.offloat(listview, "translationy", 0, Interpolator.getendoffset( ))
Animator.setduration(interpolator.getduration( ));
Animator.setinterpolator(interpolator);
Animator.start( );
```

In some embodiments, implementation code of a friction animation class may be shown as follows:

```
Public constructors:
Hwflinganimation (K object, floatpropertycompat<K> property, float initvelocity, float friction)//object: animation object; property: animation attribute;
Specifically, an example is as follows:
Hwflinganimation animation=hwflinganimation (listview, Dynamicanimation.TRANSLATION_Y, 2000F, 0.5F);
Animation.start( );
```

(3) Pinching Engine

The electronic device 100 identifies that a received user operation is a pinching gesture, and in response to the user operation, the electronic device 100 invokes, from the animation configuration file, a physical engine and an attribute parameter of a pinching design, to implement a pinching effect. A basic function of the pinching gesture is scaling, and the pinching gesture may further implement functions such as a rotation and a movement. The user performs an inward/outward pinching action on the touchscreen of the electronic device 100 by using a finger, and the electronic device 100 displays a corresponding pinching animation based on the pinching action of the user.

Parameters in an implementation of the pinching animation include parameters such as a finger-following ratio and a maximum/minimum scaling value.

Figure 10:
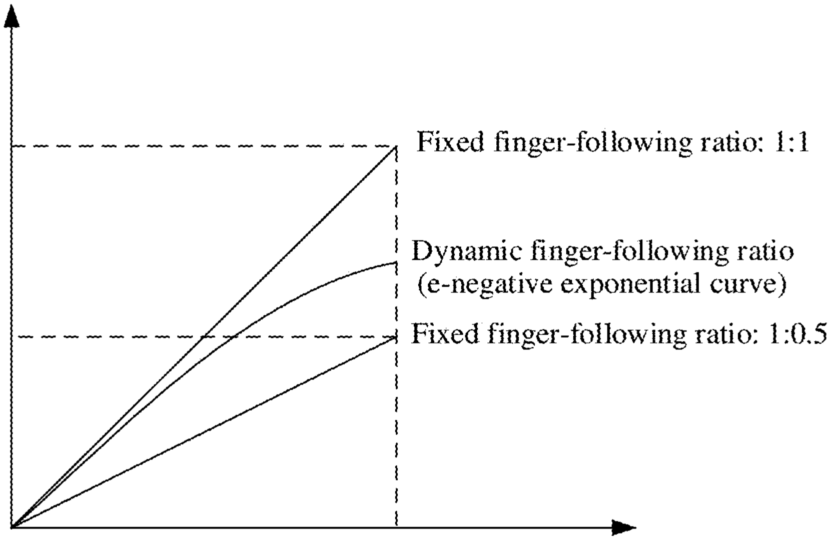
FIG. 10 is an example of a curve diagram of a finger-following ratio according to an embodiment of this application.

The finger-following ratio is a ratio relationship between a finger behavior process and an animation process during inward/outward pinching. FIG. 10 shows examples of three finger-following ratios. A fixed finger-following ratio 1:1 indicates that when the user moves 1 cm on the touchscreen of the electronic device 100 by using the finger, a current page moves 1 cm along with a direction of the user operation. A fixed finger-following ratio 1:0.5 indicates that when the user moves 1 cm on the touchscreen of the electronic device 100 by using the finger, a current page moves 0.5 cm along with a direction of the user operation. This application provides a dynamic finger-following ratio. A curve in FIG. 10 shows a displacement of a page moving along a direction of a user operation. The curve is an e-negative exponential curve, and a curvature of the curve may be adjusted by changing a parameter.

For the pinching operation, the fixed finger-following ratio 1:1 indicates that when the user scales up a target module on the touchscreen of the electronic device 100 by 1 cm by using the finger, a length and a width of the target module on the current page are respectively enlarged by 1 cm; and the fixed finger-following ratio 1:0.5 indicates that when the user scales up a target module on the touchscreen of the electronic device 100 by 1 cm by using the finger, a length and a width of the target module on the current page are respectively enlarged by 0.5 cm. The dynamic finger-following ratio shows a correspondence between a moving displacement of a page and a direction of a user operation, as shown in the curve in FIG. 10. The curve is an e-negative exponential curve, and a curvature of the curve may be adjusted by changing a parameter.

The maximum/minimum scaling value includes a maximum/minimum pinchable value and a maximum/minimum static value.

In some embodiments, parameters related to an implementation of the pinching animation may further include parameters such as a rotation angle, a movement displacement, transparency, and a blur value. On this basis, other parameters, such as inertia and a rebound, may further be associated with and bound to the pinching animation. The inertia means that after the user performs an operation and releases the operating hand, an object may continue to perform a small motion by inheriting a pinching velocity and direction. The rebound means that after the user performs an operation and releases the operating hand, an object rebounds and resets when a preset condition is met. For example, when the user performs the outward pinching action on the touchscreen of the electronic device 100 by using the finger, the target module is scaled up. If a size of the target module exceeds a maximum preset size, after the user releases the operating hand, the size of the target module rebounds to the maximum preset size or the target module rebounds to an original size. For another example, when the user performs the inward pinching action on the touchscreen of the electronic device 100 by using the finger, the target module is scaled down. If the size of the target module is less than a minimum preset size, after the user releases the operating hand, the size of the target module rebounds to the minimum preset size or the target module rebounds to the original size.

(4) Dragging Engine

The electronic device 100 identifies that a received user operation is a dragging gesture, and in response to the user operation, the electronic device 100 invokes, from the animation configuration file, a physical engine and an attribute parameter of a dragging design, to implement a dragging effect. The user performs a dragging action on the touchscreen of the electronic device 100 by using the finger, and the electronic device 100 displays a corresponding dragging animation based on the dragging action of the user.

Parameters related to an implementation of the dragging animation include the finger-following ratio. During dragging, a ratio relationship between a finger behavior process and an animation process may be set. For the ratio relationship, refer to the related description in FIG. 10. Details are not described herein again.

For the dragging operation, the fixed finger-following ratio 1:1 indicates that when the user moves 1 cm on the touchscreen of the electronic device 100 by using the finger, a current page moves 1 cm following the finger; and the fixed finger-following ratio 1:0.5 indicates that when the user moves 1 cm on the touchscreen of the electronic device 100 by using the finger, a current page moves 0.5 cm following the finger. The dynamic finger-following ratio shows a correspondence between a moving displacement of a page and a direction of a user operation, as shown in the curve in FIG. 10. The curve is an e-negative exponential curve, and a curvature of the curve may be adjusted by changing a parameter.

In some embodiments, the parameters related to the implementation of the dragging action may further include a size change and a shape change of an object. The interpolator in the spring engine may be used in a size or shape change process. Details are not described herein again.

(5) Page Turning Engine

The electronic device 100 identifies that a received user operation is a page turning operation, and in response to the user operation, the electronic device 100 invokes, from the animation configuration file, a physical engine and an attribute parameter of a page turning design, to implement a page turning effect. A condition for the electronic device 100 to identify that the user operation is a page turning operation may include one or more of the following:

Condition 1: A sliding velocity of the user operation in a preset direction is greater than a threshold.

Condition 2: A sliding distance of the user operation in a preset direction is greater than a threshold.

It may be understood that the two conditions are examples, and cannot constitute a limitation on this embodiment of this application. Optionally, the conditions have priorities. For example, a priority of the condition 1 is higher than a priority of the condition 2. If the user operation meets the condition 2 but does not meet the condition 1, the user operation cannot be determined as a page turning operation.

Figure 11A:
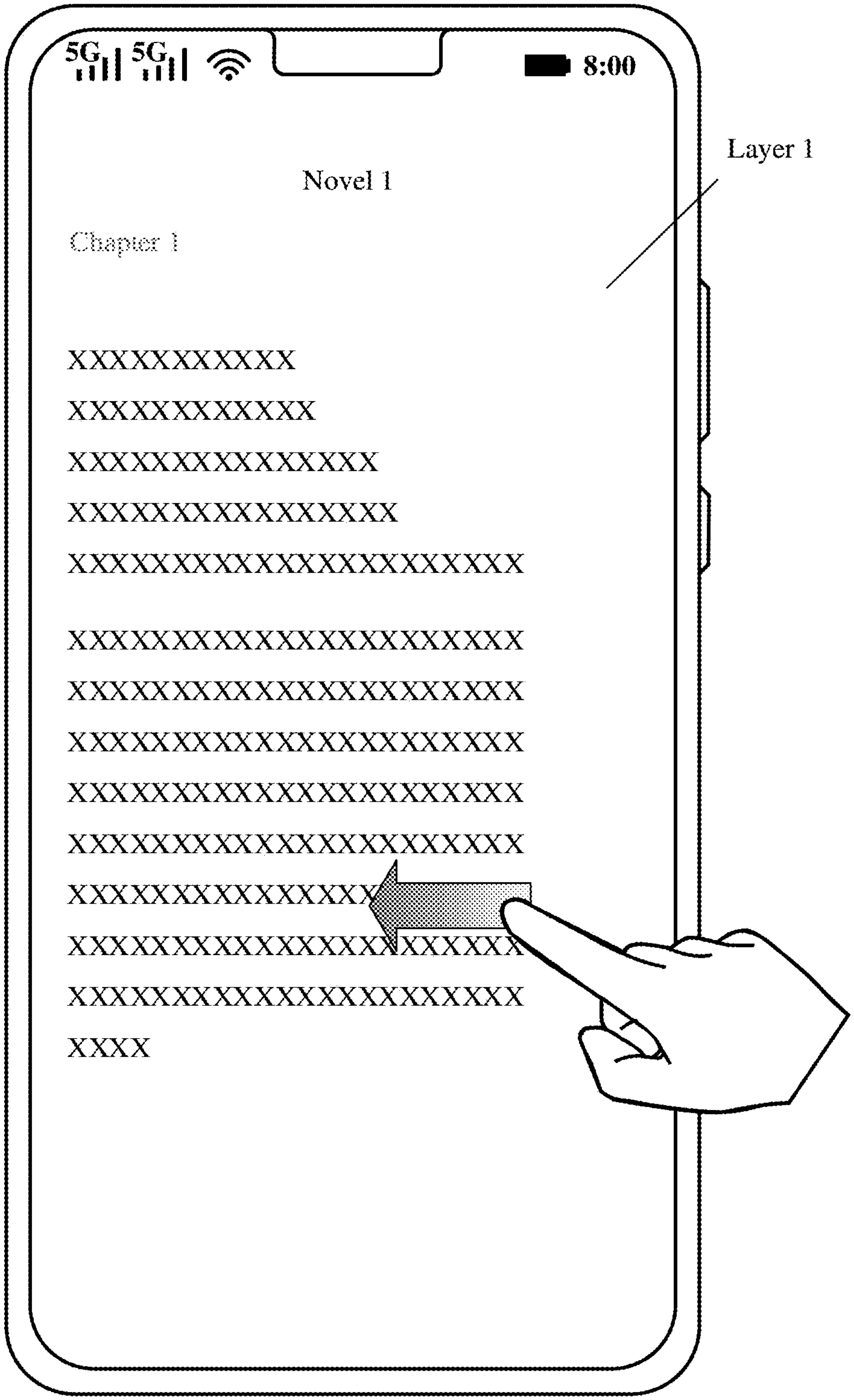
FIG. 11A and FIG. 11B are a schematic diagram of a scene of a mask transition effect according to an embodiment of this application.
Figure 11B:
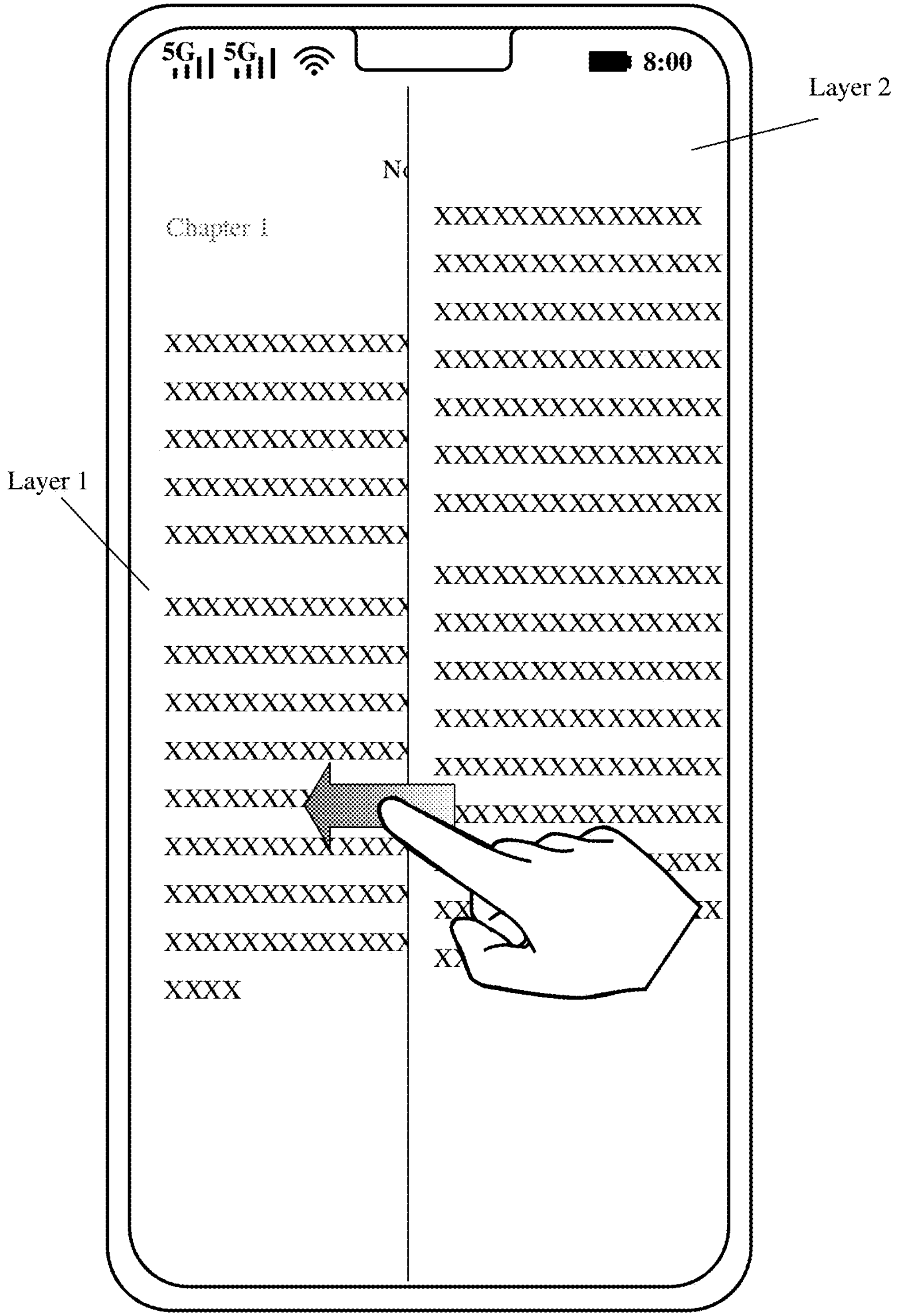

Parameters related to an implementation of a page turning animation include the finger-following ratio. As shown in FIG. 11A and FIG. 11B, when the finger of the user slides a layer 1, a dynamic ratio relationship (a decrease of a finger-following coefficient, for example, the related descriptions of the curve in FIG. 10) or a fixed finger-following ratio may be generated between a layer movement distance and a finger sliding distance.

In some embodiments, the implementation of the page turning animation relates to an elastic force model. For specific descriptions herein, refer to related descriptions of the formula ① and the formula ②. A third-party application may also customize an elasticity-related coefficient (a stiffness/damping coefficient) in the elastic force model.

After the user releases the operating hand, the page is affected by a spring and returns to an initial position. In some embodiments, after the user releases the operating hand, the page inherits a sliding acceleration at a moment when the operating hand is released, and is affected by the spring to implement page turning.

(6) Sliding Engine

The electronic device 100 identifies that a received user operation is a sliding gesture, and in response to the user operation, the electronic device 100 invokes, from the animation configuration file, a physical engine and an attribute parameter of a sliding design, to implement a sliding effect. The user performs a sliding action on the touchscreen of the electronic device 100 by using the finger, and the electronic device 100 displays a corresponding sliding animation based on the sliding action of the user.

Parameters related to an implementation of the sliding animation include the finger-following ratio. During sliding, a ratio relationship between a finger behavior process and an animation process may be set. For the ratio relationship, refer to the related description in FIG. 10. Details are not described herein again. In a finger-following sliding phase, the finger slides horizontally/vertically on an interface, and the interface/element is displaced with a sliding distance of the finger.

On this basis, other parameters, such as the friction and the rebound, may further be associated with and bound to the sliding animation. The friction relates to a friction model, and can control a page to scroll and stop due to inertia. For specific descriptions herein, refer to related descriptions of the formula ③ and the formula ④. A third-party application may also customize a related coefficient (a friction coefficient) in the friction model.

The rebound includes an inertia rebound and a hand release rebound. The inertia rebound means that the page is not stopped by the friction when the page is scrolled to a boundary, and the page rebounds to the boundary or reset after the page crosses the boundary. The hand release rebound means that the page is dragged to the boundary by using a user operation, and the page rebounds to the boundary or reset after the operating hand is released. In some embodiments, the hand release rebound relates to an elastic force model. After the user releases the operating hand, the page moves based on the elastic force model.

In some embodiments, there are a plurality of elements on a page currently displayed by the electronic device 100, and the electronic device 100 may sequentially define an animation feature attribute of each element based on a position of each element away from a boundary. After a parameter of an element is set, another associated element may be set based on the parameter (where a ladder relationship is automatically calculated based on a page height/width and a distance between elements). In some embodiments, an element at a current position of the finger is used as the boundary, to divide the interface into two groups of content, and animation feature attributes of the two groups of content are separately defined.

3. System Animation

The system animation is an animation template preset in the animation configuration file, and provides an animation used in a transition scene. The transition scene includes an application-to-detail transition, a cross-application transition, a landscape/portrait transition, a search transition, and the like. Compared with a static interface, a dynamic system animation is more consistent with a natural cognitive system of human beings. A position relationship between elements is constructed, to convey a refined sense of space to the user and facilitate understanding of a meaning of the animation. A cognitive load of the user can be effectively reduced. A change process of the elements on the screen, change logic of the interface, and a change relationship between layer structures become clearer and more natural due to the animation.

Different page levels determine expression manners of animations. Different expression manners convey different interaction levels. Inappropriate animation orchestration may cause a misunderstanding to the user, resulting in a declined subjective feeling of the user and poor smooth experience. When the elements on the interface have different levels, an appropriate animation may help the user to sort out a position relationship, and a sense of space of the entire system is reflected by using the animation. When a page transition is designed, an architecture relationship of pages needs to be understood first, and an appropriate animation method is used based on the architecture relationship of the pages to express a function.

In this embodiment of this application, a page relationship includes a same-level relationship (for example, page editing, viewing, or landscape/portrait transition), a parent-child-level relationship (for example, transition from any page of an application to a details page, transition to a new page, unlocking, and searching), and a cross-level relationship (for example, switching to another application). It may be understood that in the real world, objects may be stacked on each other, but cannot penetrate each other. A sharing transition (a long take) provided in this embodiment of this application is an orchestration manner, and helps improve task efficiency of a user operation and enhance visual smoothness.

The following describes several system animations provided in this embodiment of this application by using examples.

Mask transition: The mask transition is a general left-right or up-down motion manner between pages, and is to complete a connection and transition between pages. For example, FIG. 11A and FIG. 11B show a transition effect of transiting from the layer 1 to a layer 2. The layer 2 covers the layer 1 in a form of a mask following a gesture, to implement a mask transition effect.

Figure 12A:
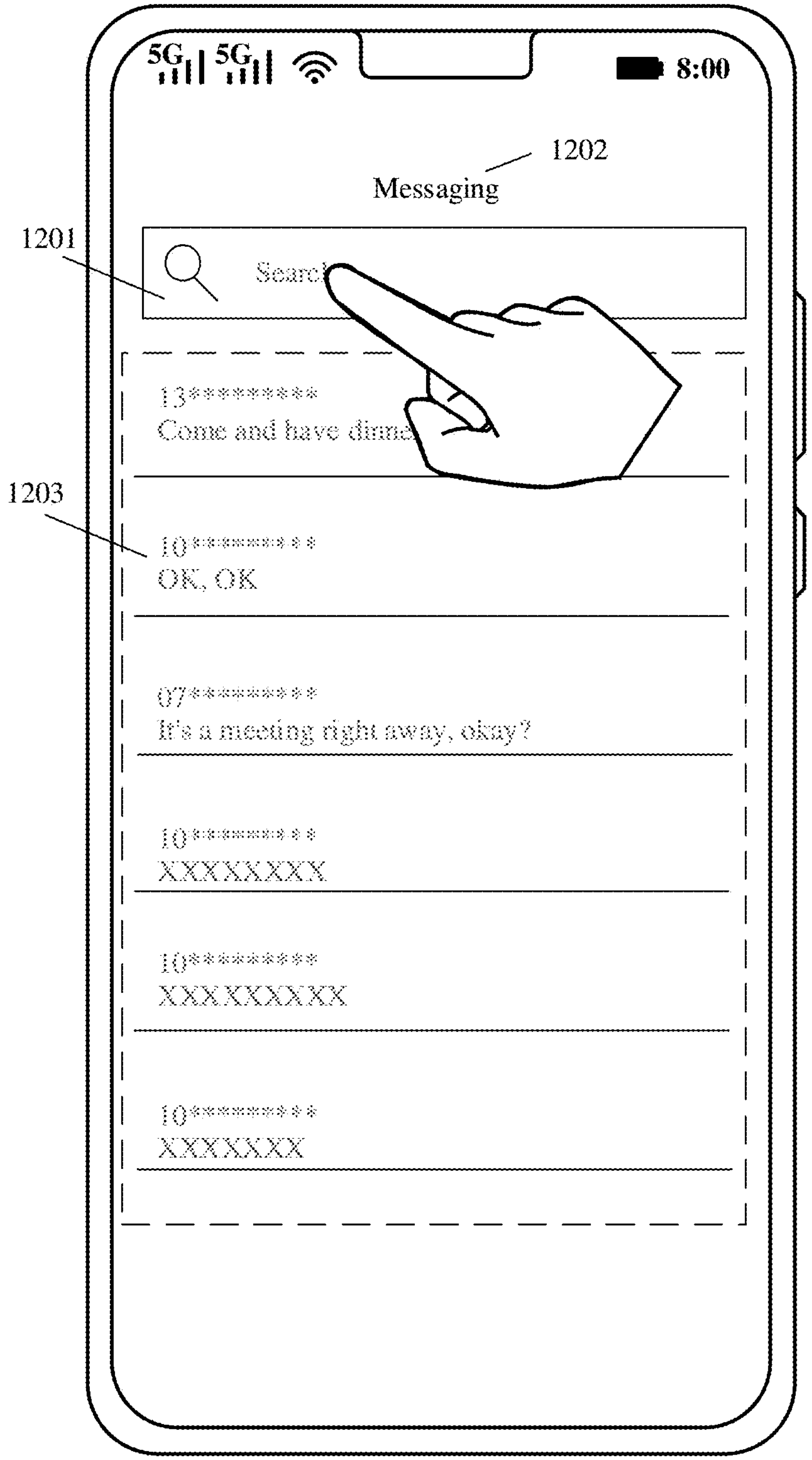
FIG. 12A to FIG. 12C are a schematic diagram of a scene of an animation of a shared element according to an embodiment of this application.
Figure 12B:
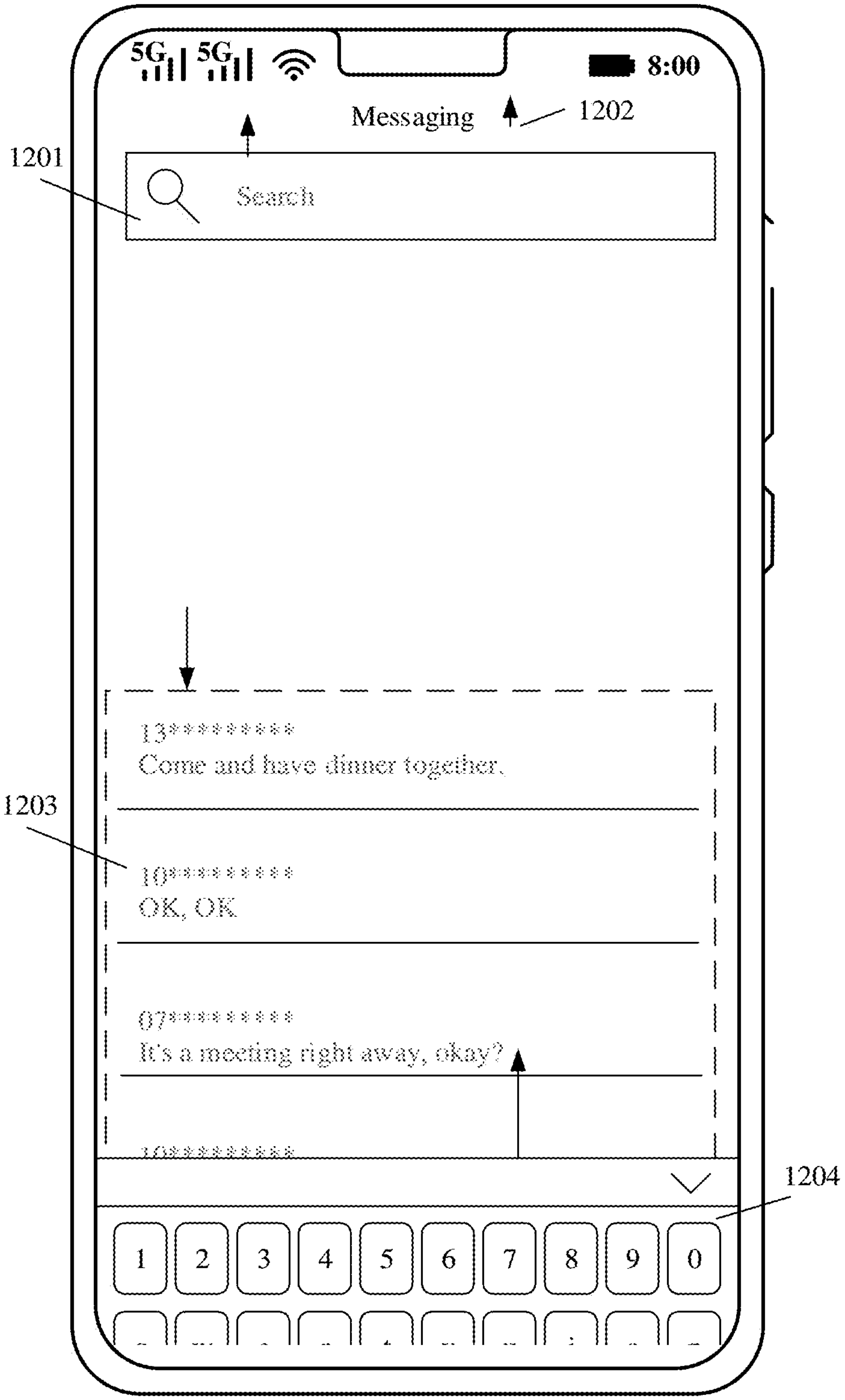
Figure 12C:
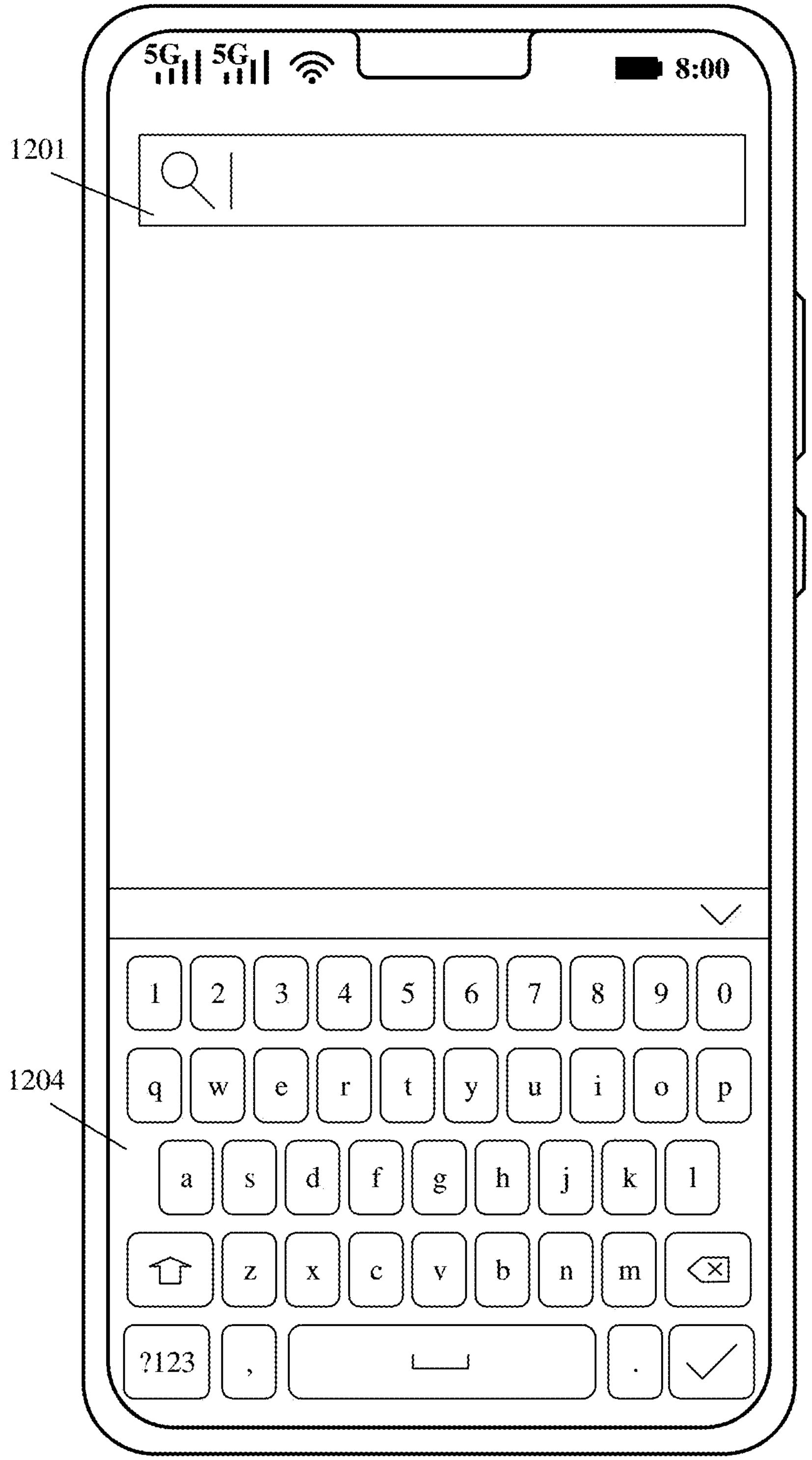

Shared element: An element is used as a unit, and a natural connection and transition of page conversion are established by using a shared element of two pages. For example, FIG. 12A shows a messaging interface. The messaging interface includes a search box 1201, a title name 1202, and an SMS message list 1203. When the electronic device 100 receives a user operation performed on the search box 1201, in response to the user operation, the electronic device 100 displays an SMS message search interface shown in FIG. 12C. The SMS message search interface includes the search box 1201 and a keyboard 1203. FIG. 12B shows an example of a system animation between FIG. 12A and FIG. 12C. Visually, when display pages in FIG. 12A and FIG. 12C are switched, an element in FIG. 12A does not disappear immediately, and an element in FIG. 12C does not appear immediately either. As shown in FIG. 12B, the title name 1202 and the SMS message list 1203 are exit elements, and a motion direction may be downward until the exit elements are completely not displayed on the display; the keyboard 1203 is an entry element, and a motion direction may be upward until the entry element moves to a preset position on the display; and the search box 1201 is a continuous element, which may also be referred to as a shared element, and may move or may not move. Here, a natural connection and transition between the two pages are implemented by using the shared element of the pages.

Figure 13A:
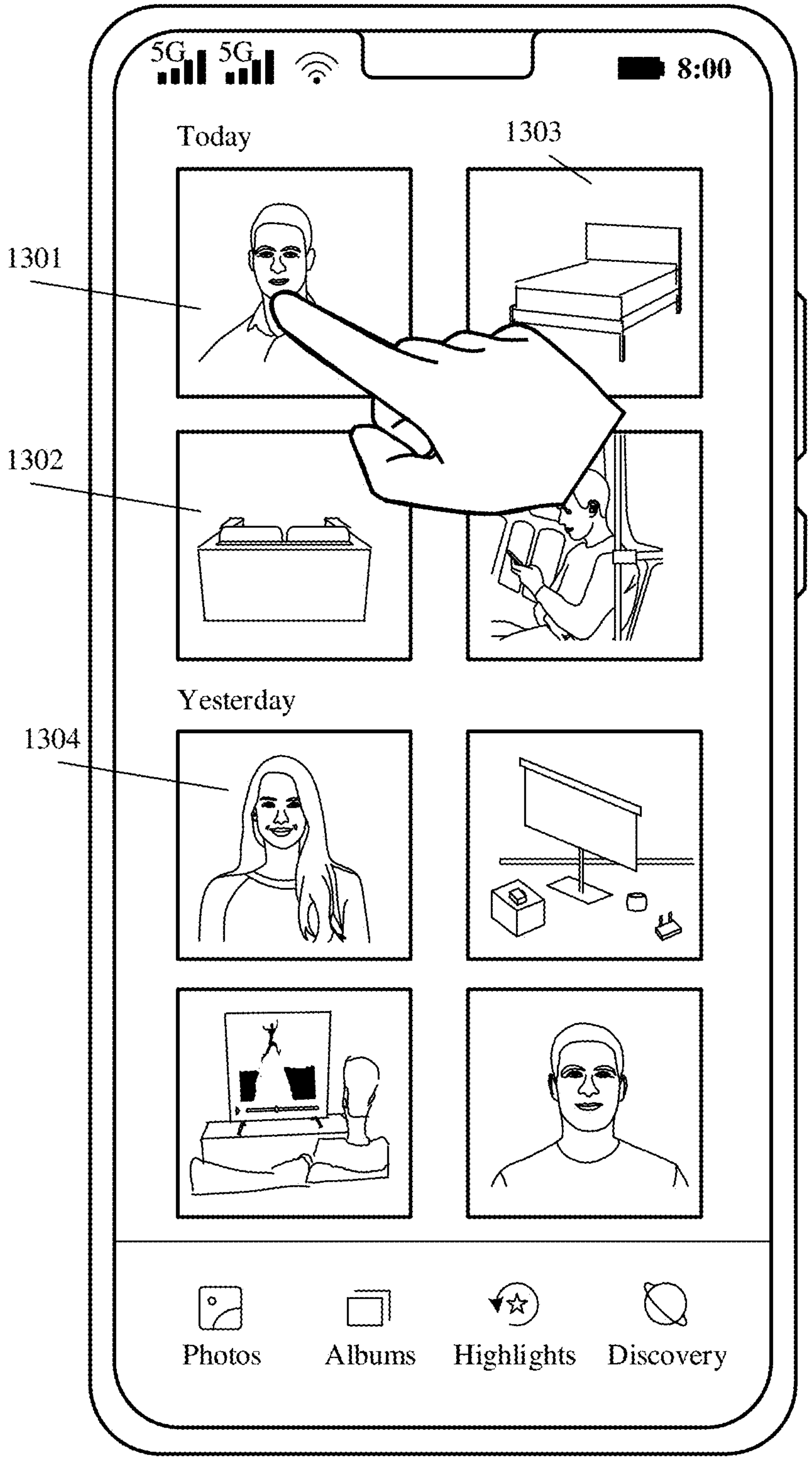
FIG. 13A to FIG. 13C are a schematic diagram of a scene of an animation of a shared container according to an embodiment of this application.
Figure 13B:
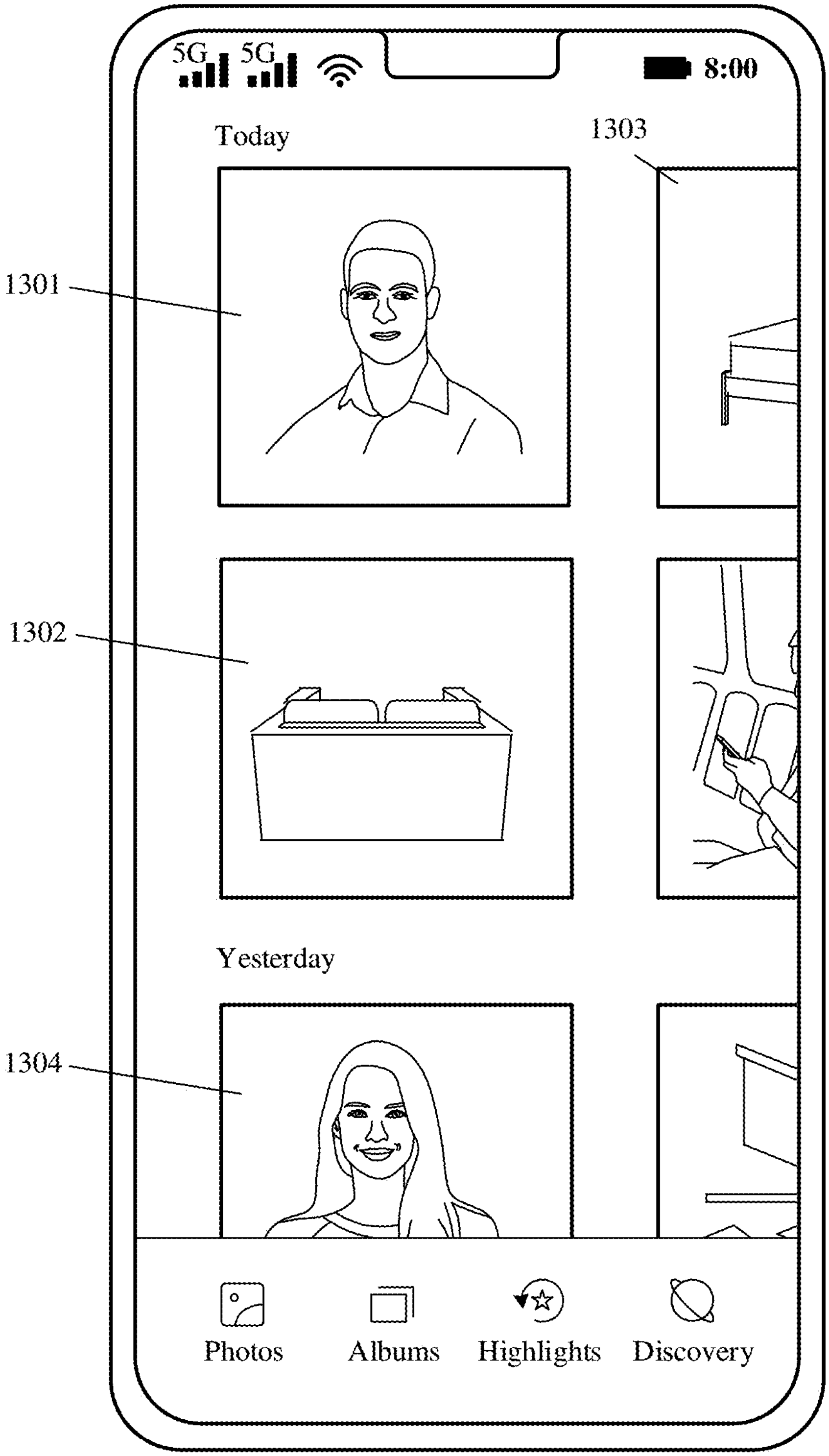
Figure 13C:
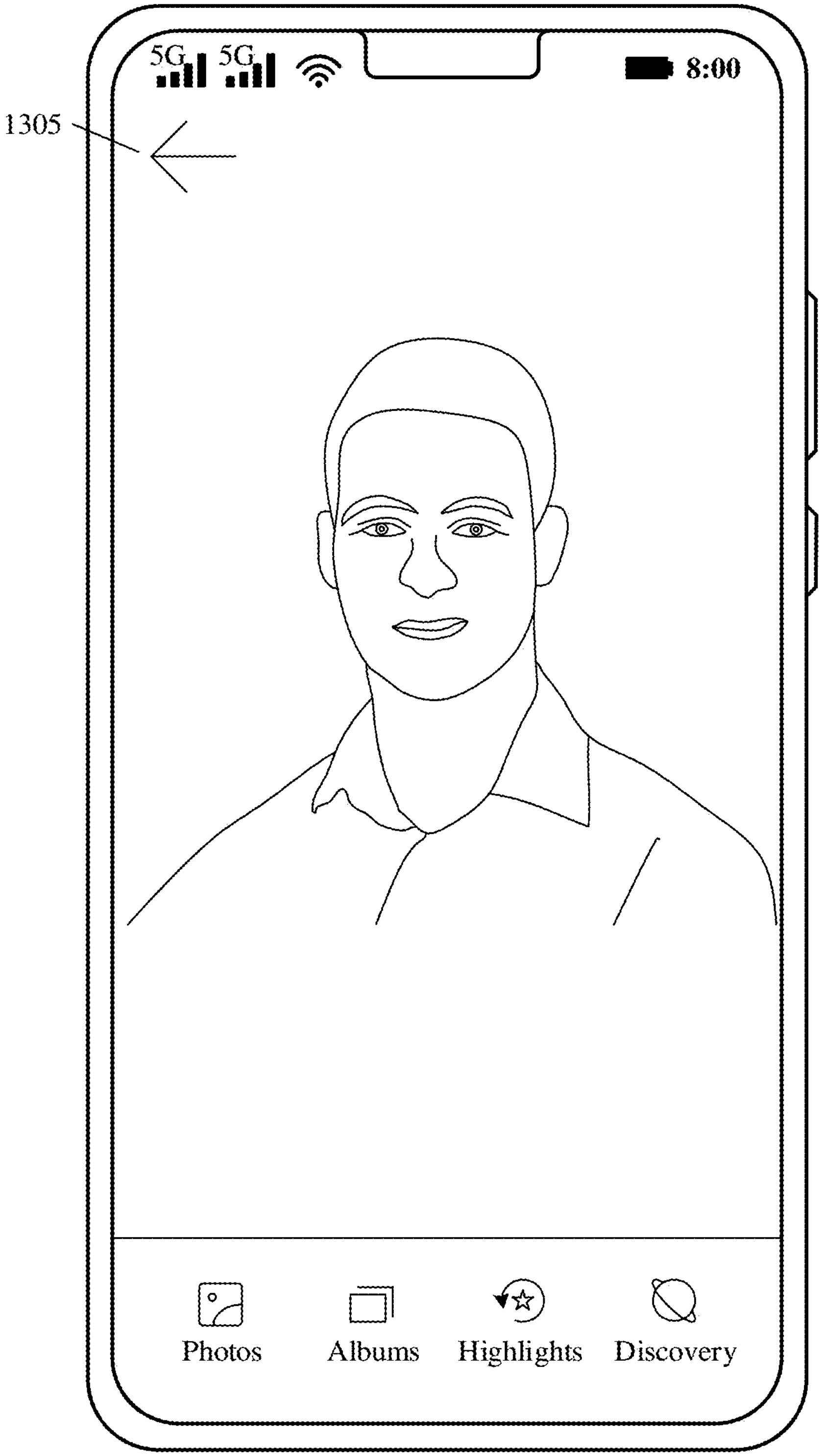

Shared container: A component is used as a unit, and through continuous moving of the component, a page connection and transition are implemented by integrating element changes in the component. For example, FIG. 13A shows a gallery interface. The gallery interface includes a plurality of thumbnails such as a thumbnail 1301, a thumbnail 1302, a thumbnail 1303, and a thumbnail 1304. When the electronic device 100 receives a user operation on the picture 1301, the electronic device 100 displays, in response to the user operation, a picture display interface shown in FIG. 13C, where the picture display interface includes a scaled-up thumbnail 1301 and a return control 1305. FIG. 13B shows an example of a system animation between FIG. 13A and FIG. 13C. Visually, when display pages in FIG. 13A and FIG. 13C are switched, element changes (where pictures are gradually scaled up) in the thumbnail 1301 are integrated to complete the page connection and transition. As shown in FIG. 13B, a plurality of thumbnails such as the thumbnail 1302, the thumbnail 1303, and the thumbnail 1304 are exit elements, and a motion direction may be scaling up regularly and moving out of the display along a diagonal; the return control 1305 is an entry element; and the thumbnail 1301 is a shared container. Optionally, in a scaling-up process of the thumbnail 1301, the exit elements are gradually transparent.

Shared momentum: Switching is performed between a page and an element, and a same motion attribute is used to implement a connection and transition between pages.

4. Control Animation

The control animation is an animation template preset in the animation configuration file, and provides animations for controls such as RecycleView and a floating action button. The control animation is mainly an animation bound to a control part in a UX framework, and similar to an animation feature attribute of the control, is provided for the user in a form of a fixed control, for example, the effects shown in FIG. 1A and FIG. 1B (where the digit button 1 turns gray).

5. Feature Animation

The feature animation is an animation template preset in the animation configuration file, and application software may freely use the feature animation. This embodiment of this application provides different feature animation templates including a feature ripple, a feature pulse, a feature rhythm, feature growth, feature fusion, feature breathing, feature rotation, and the like. Compared with a guiding interactive animation, the feature animation has a stronger animation visual style, making the user feel a distinctive personality and charm conveyed the animation.

6. Application Animation

Different applications may directly invoke corresponding application animations based on the animation configuration file. The application animation is an animation template preset for application software in the animation configuration file, for example, the camera animation, the gallery animation, and the setting animation. The animation template may include a corresponding animation template in a scene like an entry, a transition, or an exit.

The foregoing describes the animation feature attributes and the animation templates provided in the animation configuration file in this embodiment of this application. It can be learned that the animation configuration file provided in this embodiment of this application includes the animation feature attributes, the parameters corresponding to the feature attributes, and the animation templates. The animation feature attributes are a set of feature attributes summarized from features of animations, for example, including the animation duration, the animation curve, the frame rate, and the like. The set of feature attributes may be configured with different parameters to be combined into various different animations. In other words, when different animation duration, animation curves, frame rates, and the like are configured, combined animations are accordingly different. The research and development personnel may configure animation feature attribute parameters as required. The animation template is a fixed combination preset based on the animation feature attribute parameter, for example, including the physical engine, the control animation, the system animation, the feature animation, and the like described above. Each animation template has an animation feature attribute parameter. The electronic device 100 may directly invoke the animation template, and does not need to configure the animation feature attribute parameter for each animation. The electronic device 100 may provide the animation feature attribute parameter and the animation template in the animation configuration file to the application, the system, and the control for direct use.

For example, the application software may generate an animation model parameter table of the application based on the provided animation configuration file, to invoke the animation configuration file in the electronic device 100 based on the animation model parameter table. For another example, the control is associated with the animation feature attribute parameter, and the control animation in the animation configuration file may be directly invoked through an interface. The system of the electronic device 100 may directly invoke the system animation in the animation configuration file through an interface. When the animation configuration file is updated, the invoked animation effect is updated accordingly. In this way, the animations can be managed in a unified manner. In addition, this embodiment of this application provides feature configuration files applicable to different device types, so that an application can be applied to different device types to display different effects by providing only one animation model parameter table.

The following describes a specific method implementation for invoking the animation configuration file by the electronic device 100.

The electronic device 100 installs the animation configuration file in the system, and the electronic device 100 may provide an animation parameter resource externally by providing a target theme (for example, an EMUI theme) or another resource list. The electronic device 100 integrates an animation resource package, and a module needs to upgrade a software development kit (SDK) on which the module depends, including an extended resource package (APK, package-export.apk), to a corresponding version.

The application software (including a system application and a third-party application) accesses the animation configuration file by using a resource ID, generates the animation model parameter table of the application software based on the animation configuration file, and uses animation resources in the animation configuration file based on the animation model parameter table.

For example, in the animation model parameter table, @animation/emui_animation_short_time indicates that animation resource short time (short time) in the animation configuration file is invoked, or @dimen/emui_animation_leave_time indicates that animation resource leave time (leave time) in the animation configuration file is invoked, or the like. A setting of the duration parameter is used as an example, and there are two ways to use the duration parameter in the animation: setting in XML/Java code.

1. Set in Layout xml
   (1) When a Huawei animation layering parameter is used, a form of a question mark plus a Huawei package name is used, for example, font size text 1: ?Android/hwanimation:attr/emui_animation_short_time.
   (2) When an Android native attr method is used, a form of a question mark plus an Android package name is used, for example, a system highlight color: ?Android:attr/coloraccent.
2. Setting in the Code

```
//Step 1: Create an animation instance
Valueanimator anim = valueanimator.ofint(0, 3);
//Step 2: Set time of the animation
Anim.setduration(500);
//Set a time parameter based on the animation configuration file
If    (gettheme( ).resolveattribute(android.R.attr.    Emui_animation_short_time,
outvalue, true)) {
        Int timevalue = getresources( ).getanimation(outvalue.resourceId);
    Anim.setduration(timevalue);
    }
```

Similar to the time parameter, corresponding values of all other parameters can be obtained from the animation configuration file. In some embodiments, after obtaining a related attribute of the animation, the electronic device 100 may further perform secondary processing, for example, may increase or decrease an attribute value based on an actual requirement.

Figure 14:
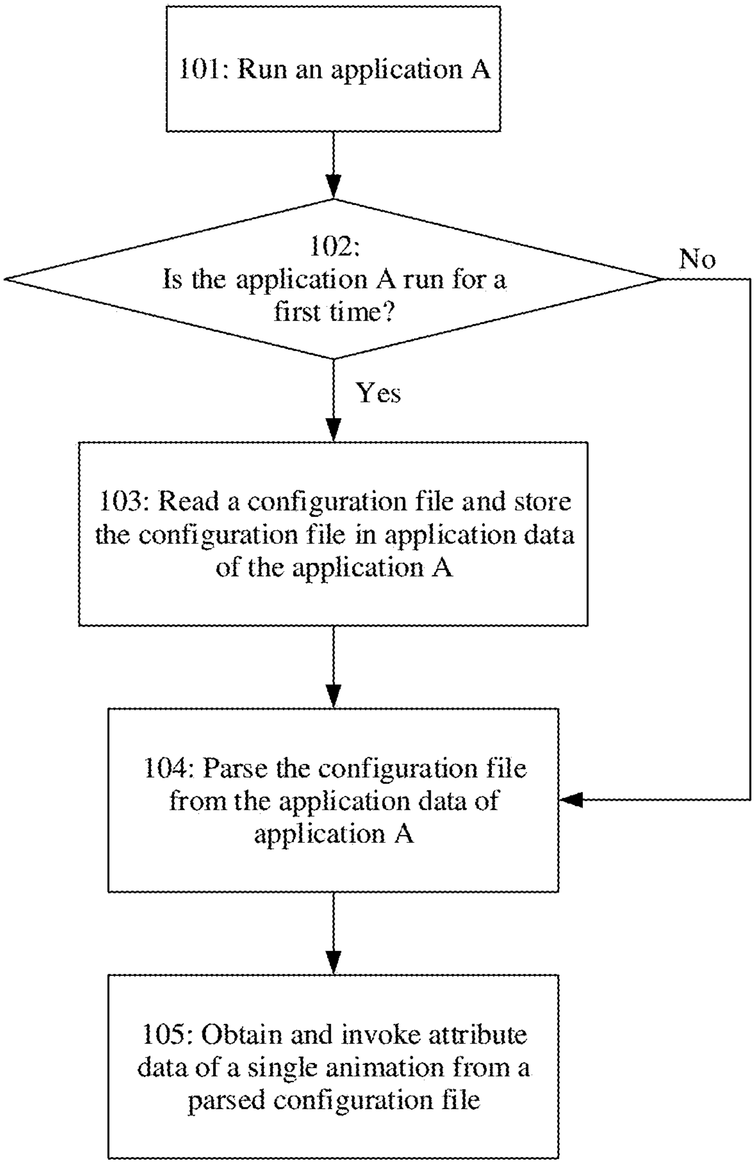
FIG. 14 is a method flowchart of an animation processing method according to an embodiment of this application.

According to an embodiment of this application, FIG. 14 shows a method procedure for invoking an animation configuration file by an application.

Step 101: An electronic device 100 runs an application A.

Step 102: Determine whether the electronic device 100 runs the application A for a first time.

The "first time" herein includes that the electronic device 100 runs the application A for a first time after installing the application A, and further includes that the electronic device 100 runs the application A for a first time after the animation configuration file is updated. In other words, that the electronic device 100 runs the application A for a first time after each time the electronic device 100 updates the animation configuration file means that the application A is run for the first time. In this case, the electronic device 100 runs the application A for the first time, and the electronic device 100 reads the animation configuration file, and stores a latest animation configuration file in the application A.

If yes, step 103 is performed: The electronic device 100 reads the animation configuration file and stores the animation configuration file in application data of the application A.

Step 104: The electronic device 100 parses the animation configuration file from the application data of the application A.

The electronic device 100 parses the animation configuration file from the application data of the application A, and generates an animation model parameter table of the application A. An animation feature attribute defined in the animation model parameter table of the application A may be the same as or different from an animation feature attribute defined in the animation configuration file.

If no, step 104 is directly performed.

Step 105: The electronic device 100 obtains and invokes attribute data of a single animation from a parsed animation configuration file.

After the electronic device 100 parses the animation configuration file from the application data, the parsed animation configuration file may be considered as the animation model parameter table of the application A. Related data of the animation feature attribute is obtained based on the animation model parameter table of the application A, and the related data of the animation feature attribute is invoked. For example, when the electronic device 100 detects that the application A is run, and an entry animation needs to be displayed in this case, the electronic device obtains, based on the animation model parameter table of the application A, an animation feature attribute parameter or an animation template required by the entry animation, and invokes the corresponding animation feature attribute parameter or animation template from the application data of the application A, to display the entry animation.

In some embodiments, after the electronic device 100 parses the animation configuration file from the application data, and generates the animation model parameter table of the application A, research and development personnel may modify a configuration of the animation feature attribute in the animation model parameter table of the application A, and then store the modified configuration in the animation model parameter table of the application A. The electronic device 100 invokes related data of the animation feature attribute based on the animation model parameter table of the application A.

For example, the entry scene animation of the application A is customized based on the animation feature attribute parameter in the animation configuration file. A duration parameter is used as an example. Duration parameters in the animation configuration file include time 1, time 2, time 3, and the like. In this case, a duration parameter of the entry scene animation may be defined as the time 1 in the animation model parameter table of the application A. When the time 1 in the animation configuration file is 10 ms, duration of displaying the entry animation by the electronic device 100 is 10 ms. When the time 1 in the animation configuration file is updated to 20 ms, a value of a "value" corresponding to the name 1 is 20 ms, and duration of displaying the entry animation by the electronic device 100 is 20 ms. Optionally, the value indicated by the "value" may alternatively be a fixed value. For example, in a scene of the entry animation, a value of a "value" that corresponds to the name 1 and that is obtained by using the animation model parameter table is 10 ms. In this case, duration of displaying the entry animation by the electronic device 100 is 10 ms.

In conclusion, application software may obtain the animation configuration file, adaptively customize and modify animation parameters in the animation model parameter table, and then use the parameters as required. Because application data takes effect only for the application, for another application, the animation configuration file at the kernel layer of the electronic device 100 may still be used independently, applications do not interfere with each other, and personalized animation effects may be implemented in the unified animation configuration file.

The following describes, based on the specific descriptions of the software system architecture and the animation configuration file, a process of replacing the animation configuration file by the electronic device 100 in this embodiment of this application. When the research and development personnel want to modify an animation parameter corresponding to an existing scene in the animation configuration file, the research and development personnel first need to obtain a name of an animation parameter that is currently expected to be modified and modify the name. After the modification is completed, the electronic device 100 generates a new animation configuration file based on a commissioning APK, and replaces the existing animation configuration file. The commissioning APK may read configurations of all current scenes and supports modification and overwriting of the configurations.

For example, an overlay is a resource replacement mechanism, and can implement resource file replacement (where a res directory is not an assert directory) without repacking an APK. The overlay is classified into a static resource overlay (SRO) and a runtime resource overlay(RRO). The RRO is also referred to as a dynamic resource overlay.

The static resource overlay occurs during complication, and needs to be configured in a system source code environment. Resource replacement of the dynamic resource overlay occurs during running. Resources of a third-party APK can be directly customized and replaced without source code.

FIG. 15 shows examples of some parameter configurations of feature attributes in an animation scene in the animation configuration file. In FIG. 15, feature attributes in an entry scene (scene transfer open enter) include, for example, an entry duration name: hw_scene_transfer_open_enter_duration, a data type: integer, and a parameter value: 300. In the entry scene, a delay duration (name: delay) whose value is 50 and a data type: integer are further included. Based on the feature attributes and configurations of feature attribute parameters, it is indicated that the feature attribute in the entry animation includes a duration attribute, a parameter value corresponding to duration is 300 ms, and the entry animation is displayed with a delay of 50 ms.

The following are configurations performed on feature attributes in sub-animation transparency (hw_scene_transfer_open_enter_alpha) of the entry scene. The following are examples:

entry duration name: hw_scene_transfer_open_enter_alpha_duration, data type: integer, and parameter value: 300;

further, delay duration hw_scene_transfer_open_enter_alpha_delay, data type: integer, and parameter value: 50;

start point of an interpolator hw_scene_transfer_open_enter_alpha_from, data type: float, parameter value: 0, end point of the interpolator hw_scene_transfer_open_enter_alpha_to, data type: float, and parameter value: 1;

name of a horizontal coordinate X1 of a node 1 of the interpolator: hw_scene_transfer_open_enter_alpha_X1, data type: float, and parameter value: 1;

name of a vertical coordinate Y1 of the node 1 of the interpolator: hw_scene_transfer_open_enter_alpha_delay, data type: float, and parameter value: 0.4;

name of a horizontal coordinate X2 of a node 2 of the interpolator: hw_scene_transfer_open_enter_alpha_delay, data type: float, and parameter value: 0.2; and name of a vertical coordinate Y2 of the node 2 of the interpolator: hw_scene_transfer_open_enter_alpha_delay, data type: float, and parameter value: 1.

Based on the feature attributes and the configurations of the feature attribute parameters, a Bezier curve is defined, to indicate that a transparency animation in the entry animation of the electronic device 100 changes based on the Bezier curve.

The foregoing are the examples of some parameter configurations of the feature attributes in the animation scene in the animation configuration file. When the research and development personnel want to modify the animation configuration file, a corresponding scene node may be queried in the animation configuration file, and an attribute is configured in the animation configuration file based on a name of the scene node.

For example, if the research and development personnel want to modify the animation duration of the entry animation of the application A, the animation parameter of the entry animation in the animation model parameter table of the application A needs to be queried and obtained. An obtained parameter value of the animation duration of the entry animation is app_open_duration. Then, it is defined in the animation configuration file (for example, a resource file in frameworks/base/core/res-hwext/res/values/integers.xml) that:

<integer name="app_open_duration">−1</integer>, where the integer is a data type (type); the data type includes int, float, double, and the like; and an initial value defined as −1 is an invalid value, or the value may be defined as a default recommended value, for example, 150.

Next, a new scene is established in/frameworks/base/core/res-hwext/res/values/symbols.xml:

<java-symbol type="integer" name="app_open_duration"/>

Only configurations of the type and the name are described herein. A specific modified parameter value may be set by a user, or may be a default value, for example, 150.

After the configuration is completed, the electronic device 100 dynamically obtains a modified parameter value app_open_duration of the animation duration of the scene 1. Specific code may be as follows:

```
long tempLandEnterDuration =
refreshAnimationDuration(com.android.hwext.internal.R.integer.app_open_duration);
if (tempLandEnterDuration > oL) {
landEnterAnimDuration = tempLandEnterDuration;
  }
animation.setDuration(landEnterAnimDuration);
```

For an implementation of the refreshAnimationDuration function, specific code may be as follows:

```
refreshAnimationDuration(int resId) {
long tempDuration = oL;
if (mHwextContext == null) {
return tempDuration;
  }
tempDuration = mHwextContext.getResources( ).
getInteger(resId);
return tempDuration;
}
```

tempLandEnterDuration may use a default obtained value, or may be set after dynamic modification. After the parameter is determined, the electronic device 100 generates an xml file for overlay replacement. The electronic device 100 parses an xml file generated by an adjustment system, to generate an overlay APK file. After the electronic device 100 generates the overlay APK file, the overlay APK file takes effect by after being replaced with a system version by using the commissioning APK. The commissioning APK may read configurations of all current scenes and supports modification and overwriting of the configurations. Further, the animation configuration file is replaced, and the electronic device 100 updates the animation model parameter table (a summary table).

When the electronic device 100 runs the application A next time, if the electronic device 100 runs the application A for a first time, the electronic device 100 reads the animation configuration file, and stores the animation configuration file in the application data of the application A. The "first time" herein includes that the electronic device 100 runs the application A for a first time after installing the application A, and further includes that the electronic device 100 runs the application A for a first time after the animation configuration file is updated. In other words, that the electronic device 100 runs the application A for a first time after each time the electronic device 100 updates the animation configuration file means that the application A is run for the first time. In this case, the electronic device 100 runs the application A for the first time, and the electronic device 100 reads the animation configuration file, and stores a latest animation configuration file in the application A. The electronic device 100 parses the animation configuration file from the application data, obtains related data of the animation feature attribute based on the animation model parameter table of the application A, and invokes the related data of the animation feature attribute.

The foregoing describes the method procedure for replacing the animation configuration file. The method is applicable to the case in which the existing scene in the animation configuration file is modified, and in some embodiments, is further applicable to a newly added scene in the animation configuration file. A difference lies in that in the newly added scene, different processing and implementations need to be performed based on different animation types. Resource files that need to be replaced for the different animation types are different. The animation types include a system animation, a control animation, an application animation, a feature animation, a customized animation, and the like. For example, the system animation is provided for a system to invoke, the application animation is provided for an application layer to invoke, and the customized animation is set based on the animation feature attribute parameter. The feature animation, the control animation, the system animation, a physical engine, and the like may alternatively be configured in different animation configuration files. When the research and development personnel want to add a new scene, a new configuration needs to be added in a corresponding animation configuration file based on an animation type corresponding to the scene. Then, the electronic device 100 generates a new animation configuration file based on the commissioning APK, and replaces the existing animation configuration file.

An embodiment of this application further provides an intelligent dynamic learning method. The electronic device 100 may dynamically change the parameter value (a value of a "value") of the animation feature attribute in the animation configuration file. In the method, analysis may be performed based on a use habit of the user, a current scene, and data generated by each user, and the animation configuration file is updated according to a preset rule.

Preset rule 1: The animation configuration file is updated based on an operation habit of the user, for example, an operation velocity of the user. When the user uses the electronic device 100, the electronic device 100 collects statistics on an interval between received user operations and time at which the user operations are received. If the interval between the user operations is short, that is, an operation velocity of the user operation is high in a specific time period, a personality or a requirement of the user is high efficiency. Specifically, when the electronic device 100 detects that a time interval between two adjacent user operations is less than preset time, a quantity of statistical times of the electronic device 100 is incremented by 1. If the quantity of statistical times of the electronic device 100 exceeds a threshold within the preset time (for example, within one hour), the electronic device 100 shortens a value of a "value" of a duration parameter of an animation in the animation configuration file.

In some embodiments, the electronic device 100 may specifically update the animation configuration file for a specific animation template. For example, the animation configuration file includes animation templates such as the system animation, the control animation, and the feature animation. The electronic device 100 collects statistics on an animation template correspondingly invoked by each received user operation. If a quantity of times of invoking a same animation template within preset time is greater than a threshold, the electronic device shortens a value of a "value" of a duration parameter in the animation template. Alternatively, if a quantity of times of invoking a same animation template within preset time is greater than a threshold, the electronic device shortens a value of a "value" of a duration parameter in the animation template. For example, the system animation includes a plurality of different animation styles, and the plurality of different animation styles belong to the same animation template.

For example, in a process from a start to an end of displaying an exit animation, the electronic device 100 identifies that the user frequently performs tap operations (for example, more than five times) in the process. In this case, the electronic device 100 queries a duration attribute of the exit animation based on the animation configuration file, and shortens a parameter corresponding to the duration attribute of the exit animation. For example, the parameter may be shortened to 50% of an original value. In this case, when the electronic device 100 displays the exit animation next time, duration of the exit animation is 50% of previous duration.

Preset rule 2: The animation configuration file is updated based on an operation habit of the user, for example, a use distance of the user on the electronic device 100. When the user uses the electronic device 100, the electronic device 100 detects a physical distance between a face of the user and the display. A detection manner may be implemented by using a camera, an infrared ray, or the like. If the user is always close to the screen when using the electronic device 100, the user may need a more distinct animation effect. Specifically, if the electronic device 100 detects that the physical distance between the user face and the display is less than a preset distance, and duration of this case exceeds preset time, the electronic device 100 may further increase amplitude of the animation in the animation configuration file, for example, decrease the stiffness/damping conduction coefficient in the elastic force model, for example, to 80% of an original value.

Preset rule 3: The animation configuration file is updated based on time. In the daytime (for example, 5:00 to 19:00), the user participates in work and needs to pursue efficiency. In this case, the time of the animation may be more convenient, and the effect may be simpler. In the nighttime (for example, 19:00 to 5:00 on the next day), the user is leisurely. In this case, the time and the effect of the animation may be complex and cool. The user can better experience animation beauty.

Specifically, when the electronic device 100 identifies that current time is in a first time period (for example, 5:00 to 19:00), the electronic device 100 updates the animation configuration file to a first configuration. When the electronic device 100 identifies that the current time is in a second time period (for example, 19:00 to 5:00 on the next day), the electronic device 100 updates the animation configuration file to a second configuration. A parameter value corresponding to a duration attribute of a first animation in the first configuration is shorter than a parameter value corresponding to the duration attribute of the first animation in the second configuration; or a stiffness/damping conduction coefficient of a first animation in the first configuration is greater than a stiffness/damping conduction coefficient of the first animation in the second configuration; or friction of a first animation in the first configuration is smaller than friction of the first animation in the second configuration; or the like.

Preset rule 4: The animation configuration file is updated based on a current scene, for example, a projection scene or a user self-use scene. When the electronic device 100 is used for projection, the animation is usually displayed to the public. In this case, all indicators of the animation need to be implemented based on standard aesthetics and human factors. However, when the user performs self-use, a customized implementation may be performed based on time, a habit, and the like of the user.

Specifically, when the electronic device 100 identifies that a current use mode is a projection mode, the electronic device 100 updates the animation configuration file from a third configuration to a fourth configuration. When the electronic device 100 identifies that the current use mode is a non-projection mode, the electronic device 100 restores the animation configuration file from the fourth configuration to the third configuration. The third configuration includes a personalized configuration made based on the user, and the fourth configuration is a default configuration in the animation configuration file.

For another example, a current scene is that the user catches a high-speed railway. The electronic device 100 detects that a current movement velocity of the user is greater than a threshold, determines that the user is running, and properly infers that the user is in an urgent state, for example, catching the high-speed railway or catching an airplane. In this case, the electronic device 100 updates the animation configuration file from a fifth configuration to a sixth configuration. A duration parameter of the first animation in the sixth configuration is shorter than a duration parameter of the first animation in the fifth configuration.

For example, if the electronic device 100 detects that a movement distance of the user within one second exceeds a threshold (for example, 3.6 meters), the electronic device may query a duration attribute of an animation like the system animation, the application animation, the control animation, or the feature animation in the animation configuration file, and shorten a parameter corresponding to the duration attribute. For example, the parameter may be shortened to 50% of an original value. In this case, when the electronic device 100 displays the animation like the system animation, the application animation, the control animation, or the feature animation next time, duration of the animation is 50% of previous duration.

Preset rule 5: The animation configuration file is updated based on a user setting. The user may perform a customized setting. The electronic device 100 provides an entry for setting parameters of the animation configuration file, and the user may define the parameters as required, to implement and experience animation effects. Specifically, the electronic device 100 receives a setting operation performed on the animation configuration file, and updates the animation configuration file.

In some embodiments, the animation template parameter table of the application is updated based on a user setting. The user may perform a customized setting. The electronic device 100 provides an entry for setting parameters of an animation template parameter table of an application, and the user may define the parameters as required, to implement and experience animation effects. Specifically, the electronic device 100 receives a setting operation performed on the animation template parameter table of the application A, and updates the animation template parameter table of the application A.

The foregoing describes examples of several preset rules for updating the animation configuration file. It may be understood that the preset rules are not limited in embodiments of this application.

It should be noted that the application software invokes the animation configuration file of the electronic device 100 based on the animation template parameter table of the application software. When the electronic device 100 updates the animation configuration file, animation effects of all application software change with the update of the animation configuration file. When the electronic device 100 updates the animation template parameter table of the application A, the animation effect of the application A changes with the update of the animation template parameter table, and an animation effect of another application is not affected.

In some embodiments, the user may perform a customized setting. The electronic device 100 provides an entry for setting parameters, and the user may define the parameters as required, to implement and experience animation effects. The electronic device 100 may update the animation configuration file, or may update the animation model parameter table of the application software.

The following describes a specific application scene in embodiments of this application.

The electronic device 100 runs a first application. If the first application is run for a first time, the electronic device 100 reads and stores the animation configuration file (the common configuration file and the feature configuration file of the electronic device 100) in the system of the electronic device 100 into application data of the first application. The electronic device 100 generates an animation model parameter table of the first application based on parsing of the animation configuration file. The electronic device 100 queries the animation model parameter table of the first application for a related attribute name of an entry animation and a value of a "value" corresponding to the name, for example, finds that a name 1 (duration)=a value 1 (enter time) of the entry animation of the first application. The electronic device 100 accesses the animation configuration file in the application data of the first application based on the related attribute name of the entry animation, and obtains a specific parameter value (for example, the enter time is 2 s) of the name 1. The electronic device 1000 displays, based on the obtained parameter value, animation content of the entry animation provided by the first application, for example, plays the animation content in 2 s.

After playing of the entry animation ends, the electronic device 100 displays an application interface of a home page of the first application. When the electronic device 100 detects a sliding operation on the application interface of the home page, the electronic device 100 queries a related attribute name of a sliding animation from the animation model parameter table of the first application, for example, finds that a name 1 (duration)=a value 2 (short time) and a name 2 (curve)=a value 3 (curve 1) of the sliding animation. The electronic device 100 accesses the animation configuration file in the application data of the first application based on the related attribute name of the sliding animation, and obtains specific parameter values (for example, the short time is 150 ms, and the curve 1 is a Bezier curve whit a 33-33 interpolator) of the name 1 and the name 2. The electronic device displays the sliding animation based on the obtained parameter values, for example, plays animation content in 2 s.

The electronic device 100 runs a second application. If the second application is run for a first time, the electronic device 100 reads and stores the animation configuration file (the common configuration file and the feature configuration file of the electronic device 100) in the system of the electronic device 100 into application data of the second application. The electronic device 100 queries an animation model parameter table of the second application for a related attribute name of an entry animation, for example, finds that the entry animation of the second application is an animation template 1. The electronic device 100 accesses the animation configuration file in the application data of the second application, and obtains a specific parameter value of the animation template 1, including parameters such as duration and animation content. The electronic device 100 displays the animation template 1 based on the obtained parameter value.

If the electronic device 100 updates the animation configuration file in the system, the first application is run for the first time after the update, and the electronic device 100 reads and stores the updated animation configuration file in the application data of the first application. In other words, the latest animation configuration file is stored in the application data of the first application. This is the same for the second application.

For a same application, a same dynamic model parameter table may be used in different device types. An electronic device 200 (different from a device type of the electronic device 100, for example, the electronic device 100 is a mobile phone, and the electronic device 200 is a tablet) runs the first application for a first time. The electronic device 100 reads and stores an animation configuration file (a common configuration file and a feature configuration file of the electronic device 200) in a system of the electronic device 200 into the application data of the first application. The electronic device 200 queries the animation model parameter table of the first application for a related attribute of an animation, and displays the corresponding animation based on the animation configuration file in the application data. This is the same for the second application.

In conclusion, an application may use only one animation model parameter table, to implement sharing and use of the animation model parameter table between a plurality of devices. In addition, based on optimization and update of the animation configuration file, the electronic device can manage animations of different applications in a unified manner. This can reduce manpower input of the application research and development personnel and improve development efficiency.

Figure 16:
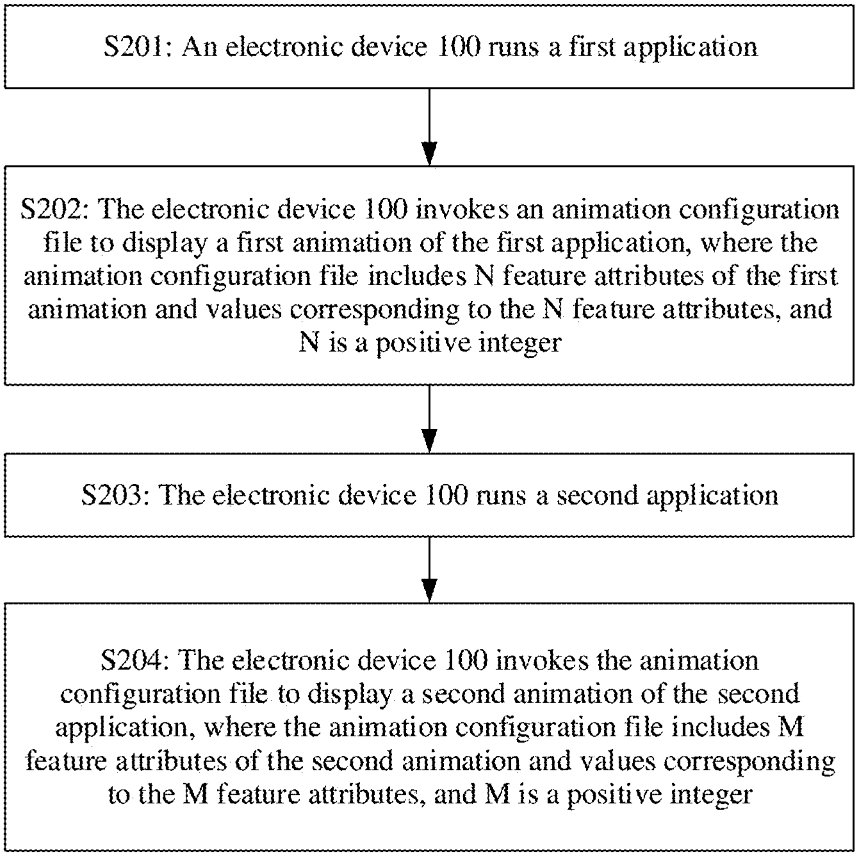
FIG. 16 is a method flowchart of another animation processing method according to an embodiment of this application.

The following describes steps of an animation processing method provided in this application. As shown in FIG. 16, the method includes the following steps.

Step S201: An electronic device runs a first application.

Step S202: The electronic device invokes an animation configuration file to display a first animation of the first application, where the animation configuration file includes N feature attributes of the first animation and values corresponding to the N feature attributes, and N is a positive integer.

Step S203: The electronic device runs a second application. The first application and the second application may be the application A and the application B mentioned in embodiments of this application.

Step S204: The animation configuration file is invoked to display a second animation of the second application, where the animation configuration file includes M feature attributes of the second animation and values corresponding to the M feature attributes, and M is a positive integer.

In this embodiment of this application, the electronic device provides the animation configuration file applicable to animation invocation of a system, a control, and an application. For applications, for example, the application A and the application B, the application A and the application B invoke a same animation configuration file, and display animations in the applications based on the same animation configuration file. Similarly, the system and the control of the electronic device may also invoke animations based on the animation configuration file. The animation configuration file includes a plurality of feature attributes of animations. The feature attributes are a set of feature attributes summarized from features of the animations. An existing animation is configured based on the set of feature attributes, so that different animations can be managed in a unified manner.

In a possible implementation, that the electronic device runs a first application includes: The electronic device receives a first operation, and the electronic device runs the first application in response to the first operation. That the electronic device runs a second application includes: The electronic device receives a second operation, and the electronic device runs the second application in response to the second operation. Herein, it is indicated that if the electronic device runs the first application based on the first operation, the first animation may be an entry animation of the first application; or if the electronic device runs the second application based on the first operation, the second animation may be an entry animation of the second application.

In a possible implementation, the N feature attributes and the M feature attributes each include a first feature attribute of the animation configuration file, and a value corresponding to the first feature attribute is a first value. The method further includes: The electronic device modifies the first value corresponding to the first feature attribute to a second value; the electronic device receives a third operation; the electronic device runs the first application in response to the third operation; the electronic device invokes the animation configuration file to display the first animation based on the second value of the first feature attribute; the electronic device receives a fourth operation; the electronic device runs the second application in response to the fourth operation; and the electronic device invokes the animation configuration file to display the second animation based on the second value of the first feature attribute. Herein, it is described that a common feature attribute of the first animation and the second animation is the first feature attribute. Because the animations of the first application and the second application are invoked based on the animation configuration file, when the value of the first feature attribute in the animation configuration file changes, display effects of the first animation and the second animation each change based on a change of the value of the first feature attribute. A system animation and a spatial animation are similar. When a value of a feature attribute in the animation configuration file changes, an animation invoked by using the feature attribute changes accordingly. Herein, the electronic device manages and modifies animations of a plurality of applications in a unified manner, thereby greatly reducing workload of research and development personnel.

In a possible implementation, the feature attributes include a duration attribute, a curve attribute, and a frame rate attribute. The feature attributes may further include a color attribute, a transparency attribute, and the like.

In a possible implementation, the method further includes: The electronic device invokes the animation configuration file to display a third animation, where the animation configuration file includes an animation template corresponding to the third animation, and the animation template is defined by at least one of the feature attributes. In this embodiment of this application, the animation template provided in the animation configuration file includes a physical engine (sliding, dragging, pinching, a velocity, a spring, friction, finger following, page turning, and the like), a system animation (a long take, a hierarchical relationship, motion orchestration, and the like), a control animation (animations of various controls), a feature animation (ripple, pulse, growth, rhythm, fusion, breathing, rotation, and the like), an application animation, and the like.

In a possible implementation, that the electronic device invokes an animation configuration file to display a first animation of the first application includes: The electronic device obtains the animation configuration file, and stores the animation configuration file in application data of the first application; the electronic device parses the animation configuration file to generate an animation model parameter table of the first application; and the electronic device obtains, based on the animation model parameter table of the first application, the N feature attributes of the first animation and the parameter values corresponding to the N feature attributes, and displays the first animation. The first application of the electronic device obtains the animation configuration file at a kernel layer and stores the animation configuration file in the application data of the first application, parses the animation configuration file to obtain an animation parameter, and generates the animation model parameter table of the first application. A corresponding animation is displayed based on the animation model parameter table of the first application. When the animation configuration file is updated, the application A and the application B obtain the animation configuration file again for update, and the displayed animations are updated accordingly. Herein, a function of managing, by the electronic device, animations of different applications in a unified manner is implemented.

In a possible implementation, a feature attribute of a fourth animation in the animation model parameter table of the first application is different from a feature attribute of the fourth animation in the animation configuration file; or a value corresponding to a feature attribute of a fourth animation in the animation model parameter table of the first application is different from a value corresponding to the feature attribute of the fourth animation in the animation configuration file. Herein, it is described that a feature attribute of an animation in the animation model parameter table of the first application may be different from that in the animation configuration file. Research and development personnel may perform customized modification on the animation model parameter table of the first application without affecting content of the animation configuration file. In other words, embodiments of this application support personalized designs of animations of application software.

In a possible implementation, the method further includes: When a preset rule is met, the electronic device modifies a value corresponding to a second feature attribute of a fifth animation in the animation configuration file. Herein, it is described that the electronic device may dynamically modify the animation configuration file when the preset rule is met, thereby improving configuration flexibility. For the preset rule herein, refer to the preset rule 1 to the preset rule 5.

The first animation, the second animation, the third animation, or the fourth animation mentioned in embodiments of this application may be one of animation templates provided based on the animation configuration file or an animation defined based on a feature attribute in the animation configuration file. The first feature attribute or the second feature attribute may be one of feature attributes in the animation configuration file.

Embodiments of this application further provide a computer-readable storage medium. The methods described in the foregoing method embodiments may be all or partially implemented by software, hardware, firmware, or any combination thereof. If the methods are implemented in the software, functions may be used as one or more instructions or code and stored in the computer-readable medium or transmitted on the computer-readable medium. The computer-readable medium may include a computer storage medium and a communication medium, and may further include any medium that can transfer a computer program from one place to another. The storage medium may be any available medium accessible to a computer.

Embodiments of this application further provide a computer program product. The methods described in the foregoing method embodiments may be all or partially implemented by software, hardware, firmware, or any combination thereof. If the methods are implemented in the software, all or some of the methods may be implemented in a form of the computer program product. The computer program product includes one or more computer instructions. When the computer program instructions are loaded and executed on a computer, all or some of the procedures or functions described in the method embodiments are generated. The computer may be a general-purpose computer, a dedicated computer, a computer network, a network device, user equipment, or another programmable apparatus.

All or some of the embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to embodiments of this application are generated. The computer may be a general-purpose computer, a dedicated computer, a computer network, or another programmable apparatus. The computer instructions may be stored in a computer-readable storage medium, or may be transmitted by using the computer-readable storage medium. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A sequence of the steps of the method in embodiments of this application may be adjusted, combined, or removed based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, comprising:

running, by an electronic device, a first application;

invoking, by the electronic device, an animation configuration file to display a first animation of the first application, wherein the animation configuration file comprises N feature attributes of the first animation and values corresponding to the N feature attributes, and N is a positive integer;

running, by the electronic device, a second application; and re-invoking, by the electronic device, the animation configuration file to display a second animation of the second application, wherein the animation configuration file comprises M feature attributes of the second animation and values corresponding to the M feature attributes, and M is a positive integer; and wherein different types of electronic devices correspond to different feature configuration files, and wherein the animation configuration file includes a common configuration file and a first feature configuration file, and all types of electronic devices correspond to the same common configuration file.

2. The method according to claim 1, wherein running, by the electronic device, the first application comprises:

receiving, by the electronic device, a first operation, and running, by the electronic device, the first application in response to receiving the first operation; and wherein running, by the electronic device, the second application comprises:

receiving, by the electronic device, a second operation, and running, by the electronic device, the second application in response to receiving the second operation.

3. The method according to claim 1, wherein the N feature attributes and the M feature attributes each comprise a first feature attribute of the animation configuration file, a value corresponding to the first feature attribute is a first value, and the method further comprises:

modifying, by the electronic device, the first value corresponding to the first feature attribute to a second value;

receiving, by the electronic device, a third operation;

re-running, by the electronic device, the first application in response to the third operation;

re-invoking, by the electronic device, the animation configuration file to re-display the first animation based on the second value of the first feature attribute;

receiving, by the electronic device, a fourth operation;

re-running, by the electronic device, the second application in response to the fourth operation; and re-invoking, by the electronic device, the animation configuration file to re-display the second animation based on the second value of the first feature attribute.

4. The method according to claim 1, wherein the M feature attributes and the N feature attributes comprise at least one duration attribute, at least one curve attribute, and at least one frame rate attribute.

5. The method according to claim 1, further comprising:

invoking, by the electronic device, the animation configuration file to display a third animation, wherein the animation configuration file further comprises an animation template corresponding to the third animation, and the animation template is defined by at least one of the N feature attributes or the M feature attributes.

6. The method according to claim 1, wherein invoking, by the electronic device, the animation configuration file to display the first animation of the first application comprises:

obtaining, by the electronic device, the animation configuration file, and storing the animation configuration file in application data of the first application;

parsing, by the electronic device, the animation configuration file to generate an animation model parameter table of the first application; and obtaining, by the electronic device based on the animation model parameter table of the first application, the N feature attributes of the first animation and the values corresponding to the N feature attributes, and displaying the first animation.

7. The method according to claim 6, wherein:

a feature attribute of a fourth animation in the animation model parameter table of the first application is different from a feature attribute of the fourth animation in the animation configuration file; or a value corresponding to a feature attribute of a fourth animation in the animation model parameter table of the first application is different from a value corresponding to the feature attribute of the fourth animation in the animation configuration file.

8. The method according to claim 1, further comprising:

when a preset rule is met, modifying, by the electronic device, a value corresponding to a second feature attribute of a fifth animation in the animation configuration file.

9. The method according to claim 8, wherein the preset rule is that within a preset time period, a quantity of times that a time interval between two adjacent user operations is less than preset time exceeds a threshold; and wherein modifying, by the electronic device, the value corresponding to the second feature attribute of the fifth animation in the animation configuration file comprises:

decreasing, by the electronic device, a value corresponding to a duration attribute of the fifth animation in the animation configuration file, wherein the second feature attribute comprises the duration attribute.

10. The method according to claim 8, wherein the preset rule is that when a current time of the electronic device is within a first time period, a configuration of the animation configuration file is a first configuration; and when the current time of the electronic device is within a second time period, the configuration of the animation configuration file is a second configuration, wherein a value corresponding to a duration attribute of the fifth animation in the first configuration is less than a value corresponding to the duration attribute of the fifth animation in the second configuration, and the second feature attribute comprises the duration attribute.

11. An electronic device, comprising:

a processor;

a memory; and a communication interface, wherein the memory and the communication interface are coupled to the processor, the memory stores computer program code, the computer program code comprises computer instructions, and when the processor executes the computer instructions, the electronic device performs the following operations:

running a first application;

invoking an animation configuration file to display a first animation of the first application, wherein the animation configuration file comprises N feature attributes of the first animation and values corresponding to the N feature attributes, and N is a positive integer;

running a second application; and re-invoking the animation configuration file to display a second animation of the second application, wherein the animation configuration file comprises M feature attributes of the second animation and values corresponding to the M feature attributes, and M is a positive integer; and wherein different types of electronic devices correspond to different feature configuration files, and wherein the animation configuration file includes a common configuration file and a first feature configuration file, and all types of electronic devices correspond to the same common configuration file.

12. The electronic device according to claim 11, wherein running the first application comprises:

receiving a first operation, and running the first application in response to the first operation; and wherein running the second application comprises:

receiving a second operation, and running the second application in response to receiving the second operation.

13. The electronic device according to claim 11, wherein the N feature attributes and the M feature attributes each comprise a first feature attribute of the animation configuration file, a value corresponding to the first feature attribute is a first value, and when the processor executes the computer instructions, the electronic device further performs the following operations:

modifying the first value corresponding to the first feature attribute to a second value;

receiving a third operation;

re-running the first application in response to receiving the third operation;

re-invoking the animation configuration file to re-display the first animation based on the second value of the first feature attribute;

receiving a fourth operation;

re-running the second application in response to the fourth operation; and re-invoking the animation configuration file to re-display the second animation based on the second value of the first feature attribute.

14. The electronic device according to claim 11, wherein the M feature attributes and the N feature attributes comprise at least one duration attribute, at least one curve attribute, and at least one frame rate attribute.

15. The electronic device according to claim 11, wherein invoking the animation configuration file to display the first animation of the first application comprises:

obtaining, by the electronic device, the animation configuration file, and storing the animation configuration file in application data of the first application;

parsing, by the electronic device, the animation configuration file to generate an animation model parameter table of the first application; and obtaining, by the electronic device based on the animation model parameter table of the first application, the N feature attributes of the first animation and the values corresponding to the N feature attributes, and displaying the first animation.

16. The electronic device according to claim 15, wherein:

a feature attribute of a fourth animation in the animation model parameter table of the first application is different from a feature attribute of the fourth animation in the animation configuration file; or a value corresponding to a feature attribute of a fourth animation in the animation model parameter table of the first application is different from a value corresponding to the feature attribute of the fourth animation in the animation configuration file.

17. The electronic device according to claim 11, wherein when the processor executes the computer instructions, the electronic device further performs the following operation:

when a preset rule is met, modifying a value corresponding to a second feature attribute of a fifth animation in the animation configuration file.

18. The electronic device according to claim 17, wherein the preset rule is that within a preset time period, a quantity of times that a time interval between two adjacent user operations is less than preset time exceeds a threshold; and wherein modifying the value corresponding to the second feature attribute of the fifth animation in the animation configuration file comprises:

decreasing a value corresponding to a duration attribute of the fifth animation in the animation configuration file, wherein the second feature attribute comprises the duration attribute.

19. A non-transitory computer storage medium, comprising computer instructions, wherein when the computer instructions are run on an electronic device, the electronic device is enabled to perform the following operations:

running a first application;

invoking an animation configuration file to display a first animation of the first application, wherein the animation configuration file comprises N feature attributes of the first animation and values corresponding to the N feature attributes, and N is a positive integer;

running a second application; and re-invoking the animation configuration file to display a second animation of the second application, wherein the animation configuration file comprises M feature attributes of the second animation and values corresponding to the M feature attributes, and M is a positive integer; and wherein different types of electronic devices correspond to different feature configuration files, and wherein the animation configuration file includes a common configuration file and a first feature configuration file, and all types of electronic devices correspond to the same common configuration file.

20. The non-transitory computer storage medium according to claim 19, wherein when the computer instructions are run on an electronic device, the electronic device is enabled to perform the following further operations:

invoking the animation configuration file to display a third animation, wherein the animation configuration file further comprises an animation template corresponding to the third animation, and the animation template is defined by at least one of the N feature attributes or the M feature attributes.

* * * * *